United States Patent
Langenfeld

(10) Patent No.: US 10,793,002 B1
(45) Date of Patent: *Oct. 6, 2020

(54) DRIVE APPARATUS

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,538

(22) Filed: Dec. 20, 2018

Related U.S. Application Data

(63) Continuation of application No. 15/477,932, filed on Apr. 3, 2017, now Pat. No. 10,166,864, which is a continuation of application No. 14/470,435, filed on Aug. 27, 2014, now Pat. No. 9,610,840, which is a continuation of application No. 12/945,415, filed on Nov. 12, 2010, now Pat. No. 8,820,066.

(60) Provisional application No. 61/261,139, filed on Nov. 13, 2009.

(51) Int. Cl.
 *F16H 39/00* (2006.01)
 *B60K 17/10* (2006.01)
 *B60T 1/06* (2006.01)
 *B60W 10/103* (2012.01)
 *B60W 10/196* (2012.01)
 *B60K 17/30* (2006.01)

(52) U.S. Cl.
 CPC ............ *B60K 17/105* (2013.01); *B60K 17/30* (2013.01); *B60T 1/062* (2013.01); *B60W 10/103* (2013.01); *B60W 10/196* (2013.01); *F16H 39/00* (2013.01)

(58) Field of Classification Search
 CPC .......... F16H 39/04; F16H 39/06; F16H 39/08; F16H 39/10; F16H 39/14
 See application file for complete search history.

(56) References Cited

U.S. PATENT DOCUMENTS

| | | |
|---|---|---|
| 1,136,363 A | 4/1915 | Pepper |
| 1,227,055 A | 5/1917 | Kellogg |
| 1,263,180 A | 4/1918 | Williams |
| 1,817,063 A | 8/1931 | Carrie et al. |
| 3,200,593 A | 8/1965 | Kuze |
| 3,209,538 A | 10/1965 | Kuze |
| 3,293,848 A | 12/1966 | Kuze |
| 3,419,096 A | 12/1968 | Zagotta |
| 3,444,690 A | 5/1969 | Henry-Biabaud |
| 3,446,305 A | 5/1969 | Cannon |
| 3,464,205 A | 9/1969 | Henry-Biabaud |

(Continued)

*Primary Examiner* — Thomas E Lazo

(74) *Attorney, Agent, or Firm* — Neal, Gerber & Eisenberg LLP

(57) ABSTRACT

A drive apparatus for a vehicle includes a hydraulic pump connected to two separate hydraulic motors by a center section. A center section hydraulically connects the pump and the motors by means of a pump running surface connected to two motor running surfaces by hydraulic porting. A plurality of projections extend from the center section. Two of the projections have a first flat surface that is coplanar with the pump running surface, and a third projection has a separate flat surface that is parallel to and offset from the pump running surface. The third projection may be disposed between the two motor running surfaces.

20 Claims, 22 Drawing Sheets

(56) References Cited

U.S. PATENT DOCUMENTS

| | | | |
|---|---|---|---|
| 4,249,631 | A | 2/1981 | Hüneke |
| 4,696,164 | A | 9/1987 | Giere |
| 5,087,227 | A | 2/1992 | Giere et al. |
| 5,174,595 | A | 12/1992 | Snipes |
| 6,131,689 | A | 10/2000 | Nodorft et al. |
| 6,601,663 | B2 | 8/2003 | Hauser |
| 6,701,825 | B1 | 3/2004 | Langenfeld |
| 6,932,179 | B2 | 8/2005 | Sakikawa et al. |
| 6,941,753 | B1 | 9/2005 | Hauser et al. |
| 6,964,164 | B1 | 11/2005 | Langenfeld |
| 6,971,234 | B1 | 12/2005 | Phanco et al. |
| 6,986,406 | B1 | 1/2006 | Hauser et al. |
| 7,044,244 | B2 | 5/2006 | Irikura |
| 7,134,278 | B2 | 11/2006 | Sakikawa |
| 7,225,617 | B1 | 6/2007 | Langenfeld et al. |
| 7,229,256 | B1 | 6/2007 | Hauser et al. |
| 7,383,913 | B1 | 6/2008 | Tsukamoto et al. |
| 7,431,122 | B2 * | 10/2008 | Iwaki ............... B60K 17/043 180/305 |
| 8,820,066 | B1 * | 9/2014 | Langenfeld ......... B60W 10/103 60/487 |
| 9,610,840 | B1 * | 4/2017 | Langenfeld ......... B60W 10/103 |
| 2007/0157750 | A1 | 7/2007 | Ishii et al. |

\* cited by examiner

DRIVE APPARATUS

CROSS-REFERENCE

This application is a continuation of U.S. patent application Ser. No. 15/477,932, filed on Apr. 3, 2017, which is a continuation of U.S. patent application Ser. No. 14/470,435, now U.S. Pat. No. 9,610,840, filed on Aug. 27, 2014, which is a continuation of U.S. patent application Ser. No. 12/945,415, now U.S. Pat. No. 8,820,066, filed on Nov. 12, 2010, which claims the benefit of U.S. Provisional Patent App. No. 61/261,139, filed on Nov. 13, 2009. The contents of these prior applications are incorporated herein in their entirety.

BACKGROUND OF THE INVENTION

This invention relates to transmissions for vehicles in general, and more particularly to hydrostatic transmissions for vehicles, such as, for example, garden tractors and lawn tractors. A hydrostatic transmission (HST) is a well known type of continuously variable transmission wherein a system of one or more hydraulic pumps transmits energy from an input shaft to one or more hydraulic motors connected to one or more output shafts. The input shaft is typically driven by a prime mover, such as an internal combustion engine or electric motor. The input shaft may be driven directly by the prime mover or indirectly, such as by a belt and pulley system connected to the prime mover. The one or more output shafts typically are connected to the vehicle's rear wheels to propel the vehicle. The hydraulic pumps and motors are contained within a transmission housing filled with hydraulic fluid, which flows in a fluid circuit from pump to motor and back again through internal porting and passages. It is this flow of hydraulic fluid which transmits energy from pump(s) to motor(s). Direction of vehicle travel is dependent on the direction of flow within the hydraulic circuit.

Various HST configurations have been used on smaller vehicles, such as lawn tractors, to overcome vehicle layout constraints. For instance, U.S. Pat. No. 6,941,753 discloses an HST transaxle having a single pump and single motor in hydraulic communication via a center section. U.S. Pat. No. 7,229,256 discloses a different HST design utilizing two separate pumps, both contained within a single housing. Still another configuration is disclosed in U.S. Pat. No. 7,225,617, wherein two separate transmission housings are employed, each containing a separate hydraulic pump/motor circuit to drive wheels independently. In configuring an HST, allowances must be made for wheel radius and width, auxiliary implements such as a mowing deck, and other essential components, all while maintaining appropriate ground clearance. Some of these constraints are discussed in U.S. Pat. No. 6,986,406, which introduces a two-piece housing shaped to allow for rear discharge of cut vegetation to a rear receptacle. The teachings of the above-referenced patents are all incorporated herein by reference. When the wheels being driven by the output shafts also have a steering function, space to package an HST may be even more limited and trade-offs may result, such as more intricate and costly HST designs or a limited turn radius.

SUMMARY OF THE INVENTION

The present invention teaches a drive apparatus for an application such as a lawn tractor comprising an HST driving steerable wheels in a unitary design. The HST comprises a central section which contains a single hydraulic pump and two hydraulic motors. The unique geometry of the pump and motor configuration enables a reduced turning radius which increases vehicle maneuverability, thereby reducing the time required to complete a task. Additionally, the wheel pivoting geometry of this design is, in the case of, for example, a lawn tractor, gentler on the vehicle tires and surfaces traversed when traveling and/or mowing. The invention also discloses other features, including for example, a single brake that can be used to simultaneously brake both hydraulic motors. Various other improvements are also disclosed and incorporated into the present invention as discussed below.

A better understanding of the objects, advantages, features, properties and relationships of the invention will be obtained from the following detailed description and accompanying drawings which set forth one or more illustrative embodiments which are indicative of the various ways in which the principles of the invention may be employed.

DETAILED DESCRIPTION OF THE DRAWINGS

Figure 1:
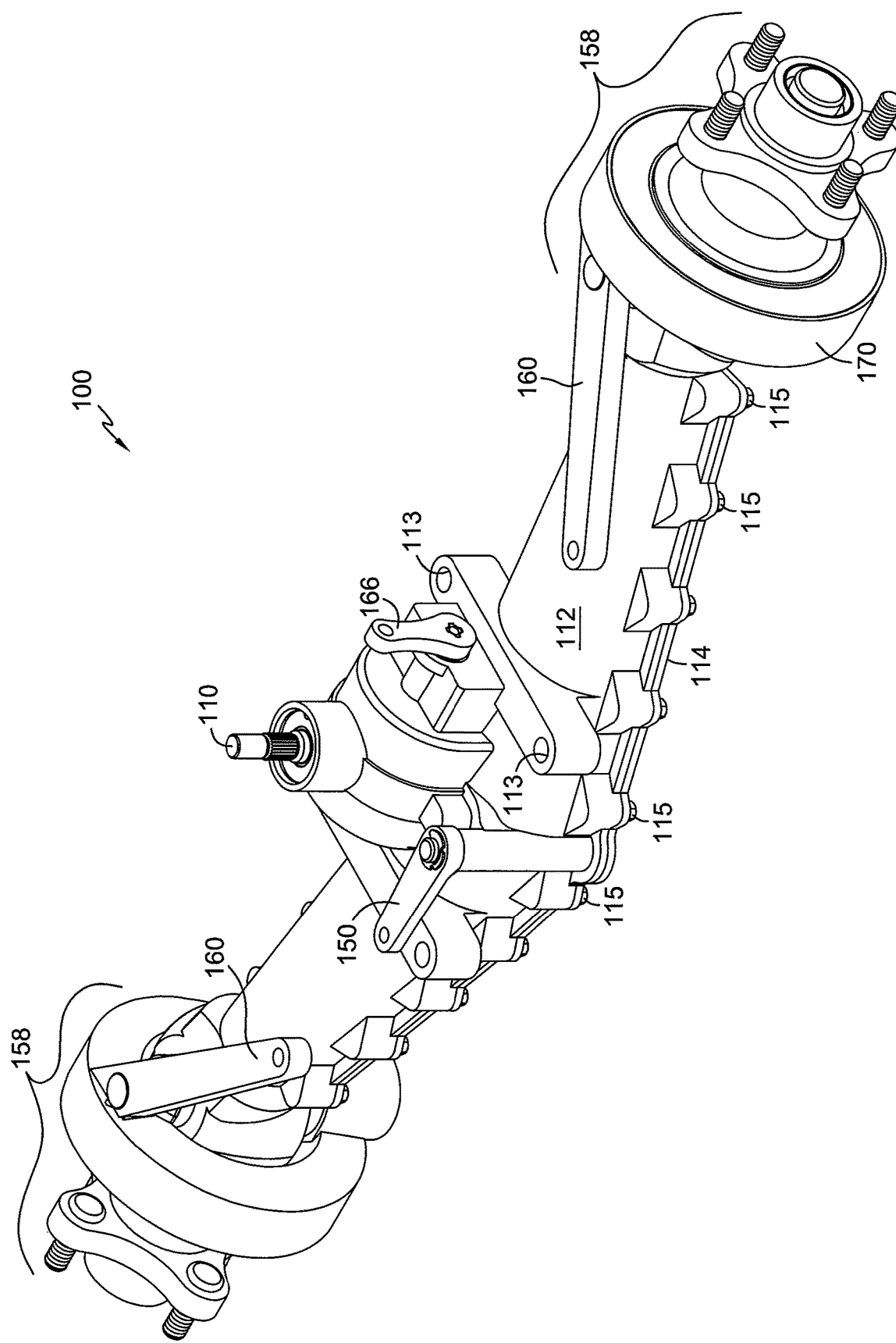
FIG. 1 is perspective view of a steerable transaxle according to one embodiment of the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

FIGS. 1-13 illustrate a steerable transaxle 100 for a vehicle according to one embodiment of the present invention. Transaxle 100 comprises an upper housing 112 and a lower housing 114 which fit together to form a central chamber for housing the hydrostatic components of transaxle 100. Housings 112 and 114 may be joined through various conventional means, such as screws, bolts, rivets, etc. In the illustrated embodiment of FIG. 1, a plurality of housing screws 115 is shown, which pass through holes along the perimeter of lower housing 114 and into threaded receptacles formed in upper housing 112. This method provides for ease of manufacturing and servicing. At each end of transaxle 100 is a hub assembly 158. As will be further explained below, each hub assembly 158 pivots about an end of transaxle 100 so as to allow the associated wheels 161 to be steered for the purpose of providing a vehicle with a reduced turning radius. Upper housing 112 provides four mounting holes 113 which are used to mount transaxle 100 to the frame of a vehicle. Mounting holes 113 are preferably optimally located to provide the required structural rigidity while providing the necessary clearance for steering arms 160, linkages and wheels. As will be further explained below, locating holes 113 toward the center of transaxle 100 allows for an improved vehicle turning radius.

Figure 2:
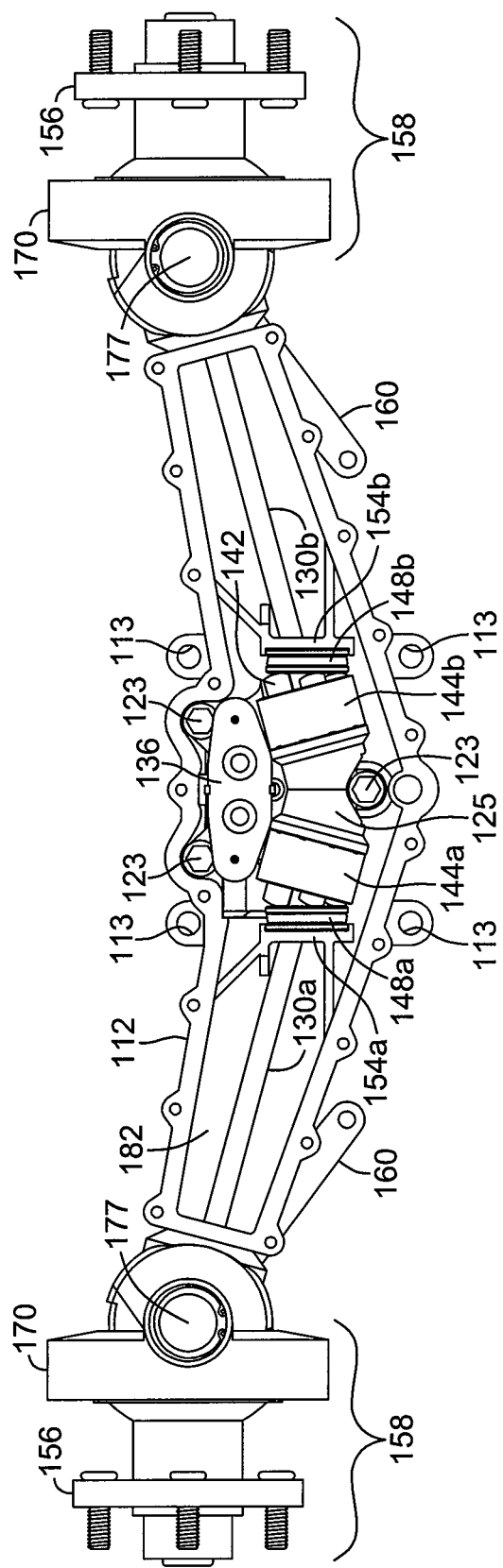
FIG. 2 is a bottom view of the transaxle of FIG. 1 with the lower housing removed.

FIG. 2 depicts the bottom of transaxle 100 with lower housing 114 and the brake components such as brake puck 153 (discussed below) removed for illustrative purposes. The interior of transaxle 100 forms a hydraulic fluid sump 182 for the hydrostatic components. In some embodiments, this sump 182 may be confined to the center area of transaxle 100, partitioned off, for instance, by thrust bearing support structures 154a and 154b which are further explained below. In an alternative embodiment shown in, e.g., FIGS. 14-21, separate axle horns are used to create such segregation, as discussed in detail below. The embodiment depicted in FIGS. 1-13 is designed to allow hydraulic fluid throughout the interior of transaxle 100, including hub assemblies 158.

Figure 3:
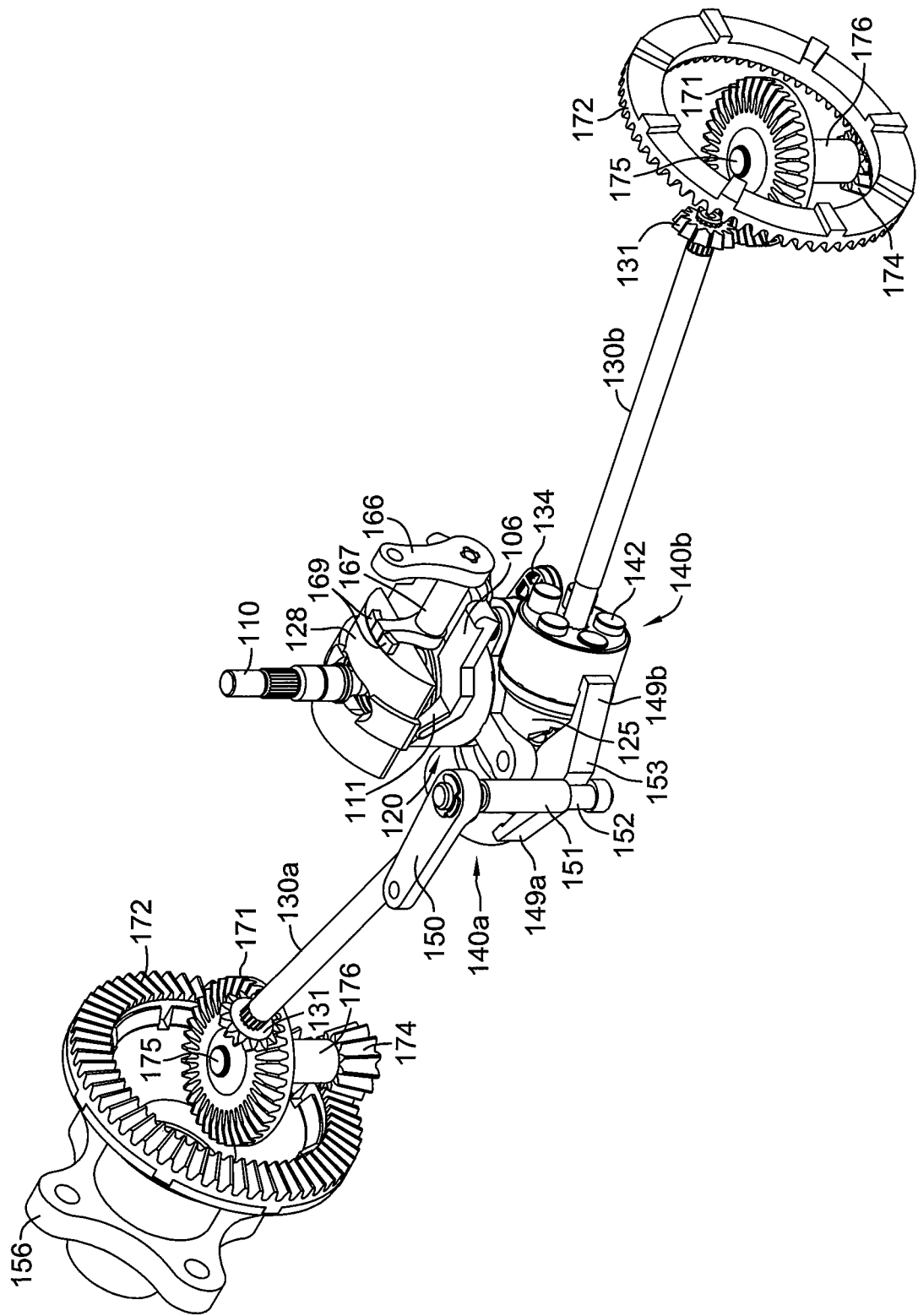
FIG. 3 is a perspective view of the transaxle of FIG. 1 with both housings and certain other components removed to illustrate internal components of the transaxle.

Hydraulic pump 120 and hydraulic motors 140a, 140b can be seen in FIG. 3, where both upper and lower housings 112 and 114 have been removed for clarity. Pump 120 and motors 140a, 140b are both disposed on center section 125, as described herein. While these rotating cylinder blocks are depicted as being directly mounted on their respective running surfaces 117, 118a and 118b, it will be understood that valve plates may also be used. Center section 125 is located in the fluid sump 182 and is mounted by known means to upper housing 112, such as by the three illustrated mounting screws 123. Center section 125, which is depicted as a unitary component in these figures, comprises a pump running surface 117 and two motor running surfaces 118a, 118b, as shown most clearly in FIG. 5. Center section 125 serves as both a support structure for other components of transaxle 100 and, through internal porting and passages, a conduit for hydraulic fluid to flow from a hydraulic pump 120, which rotates on pump running surface 117, to hydraulic motors 140a, 140b, which rotate on motor running surfaces 118a, 118b.

As seen in FIGS. 2-5, transaxle 100 further comprises an input shaft 110 and two output shafts 130a, 130b. Input shaft 110 is driven by a prime mover (not shown), and may be driven directly, through gearing connections, or through a belt and pulley system connected to a prime mover output shaft (not shown) located elsewhere in the vehicle. Input shaft 110 is engaged to and rotates pump cylinder block 124 of hydraulic pump 120 on running surface 117 of center section 125. The hydraulic pump 120 is generally of the same axial piston design as hydraulic motors 140a, 140b. In the illustrated embodiment, each pump and motor comprises a rotating cylinder block with a plurality of pistons positioned radially around input shaft 110 (in the case of pump 120) or output shafts 130a, 130b (in the case of the motors 140a, 140b). Motor pistons 142 engage thrust bearings 148a, 148b, each of which is positioned at an angle to the adjacent planar surface of the respective motor cylinder block 144a, 144b and retained by the respective thrust bearing support structure 154a, 154b. Thrust bearing support structures 154a, 154b may be integrally formed with the housing 112, as shown, or may be welded in place, bolted into the upper-to-lower housing joint, or affixed in other known fashions.

Figure 4:
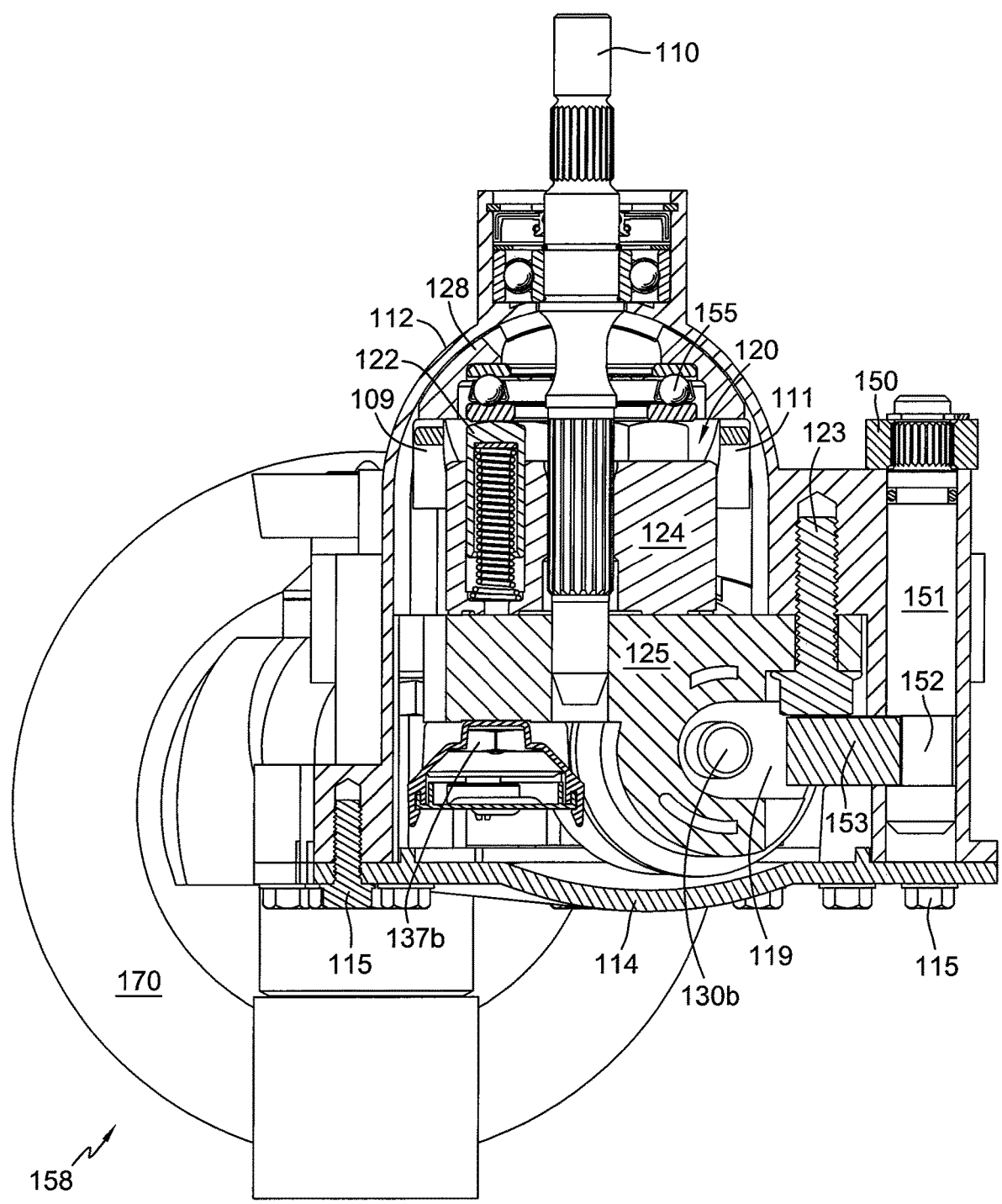
FIG. 4 is a cross-sectional view along the line 4-4 of FIG. 12.

As shown in FIG. 4, swash plate 128 retains thrust bearing 155 which engages pump pistons 122. Swash plate 128 can be pivoted to determine the direction of flow within the hydraulic circuit formed by center section 125. Though five pistons are shown, other embodiments may utilize a different number of pistons in the pump and/or motor cylinder blocks depending on the performance requirements of the individual application. When swash plate 128 is parallel to the adjacent planar surface of pump cylinder block 124, the hydraulic circuit will be idle and transaxle 100 will be in a neutral position. Though pump cylinder block 124 will still rotate at a velocity relative to the rotational speed of the prime mover, and pump pistons 122 will rotate with cylinder block 124, the pistons 122 will not actuate up and down to drive the hydraulic circuit. However, when swash plate 128 is pivoted into a tilted forward or tilted rearward position relative to pump cylinder block 124, pump pistons 122 begin to actuate up and down as they rotate about swash plate 128. This piston actuation induces flow within the hydraulic circuit. The direction of flow is dependent upon the forward or rearward tilt direction of swash plate 128.

Figure 5:
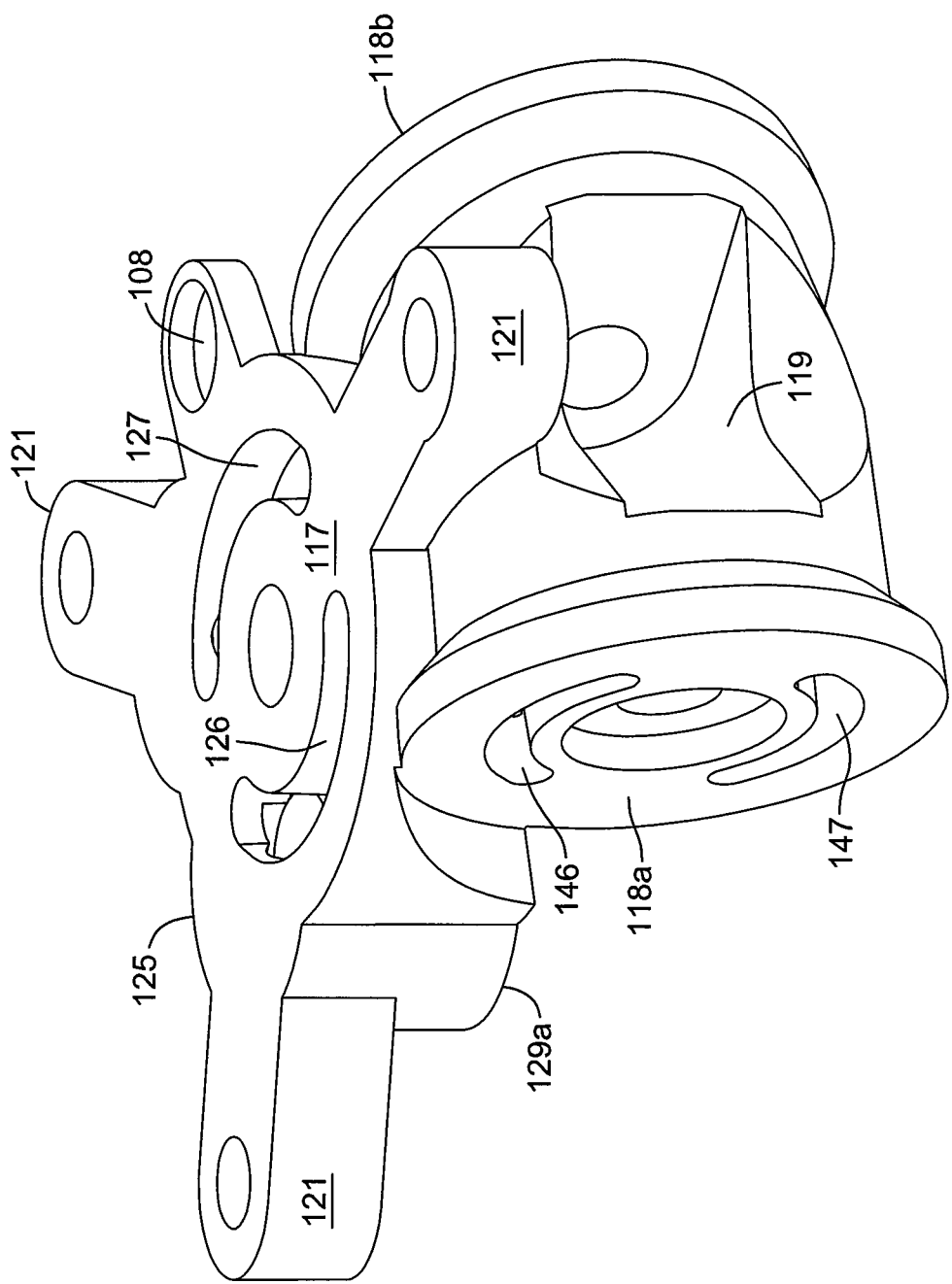
FIG. 5 is a perspective view of the center section of the transaxle of FIG. 1.
Figure 6:
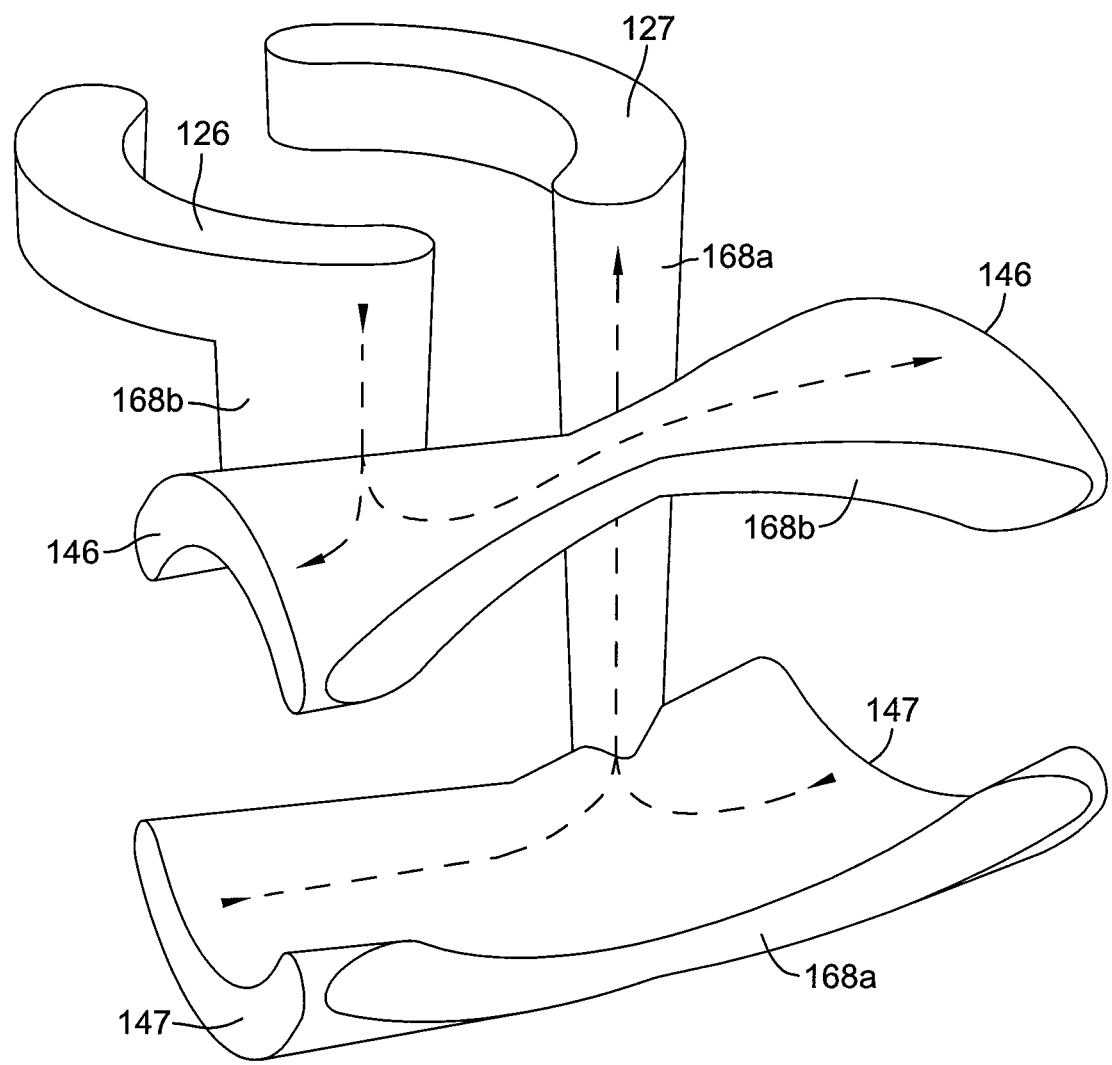
FIG. 6 is a representational drawing of a portion of the hydraulic porting and passages located within the center section of FIG. 5, to show fluid flow therein.

The hydraulic circuit formed in center section 125 can be more fully understood when viewing the perspective view of center section 125 shown in FIG. 5 and the representational view of the porting and fluid passages shown in FIG. 6. As illustrated, center section 125 is a unitary component, such as a casting, featuring a single pump running surface 117 and dual motor running surfaces 118a, 118b. Extending from pump running surface 117 are three mounting projections or extensions 121 for mounting center section 125 to the upper housing 112 using screws 123 as previously described, and a single spring seat 108 for supporting spring 107 used in association with a return-to-neutral (RTN) mechanism, shown in more detail in FIG. 7. While each mounting extension 121 features a hole for a screw 123, spring seat 108 is merely a depression, having a bottom surface which spring 107 contacts.

Figure 5A:
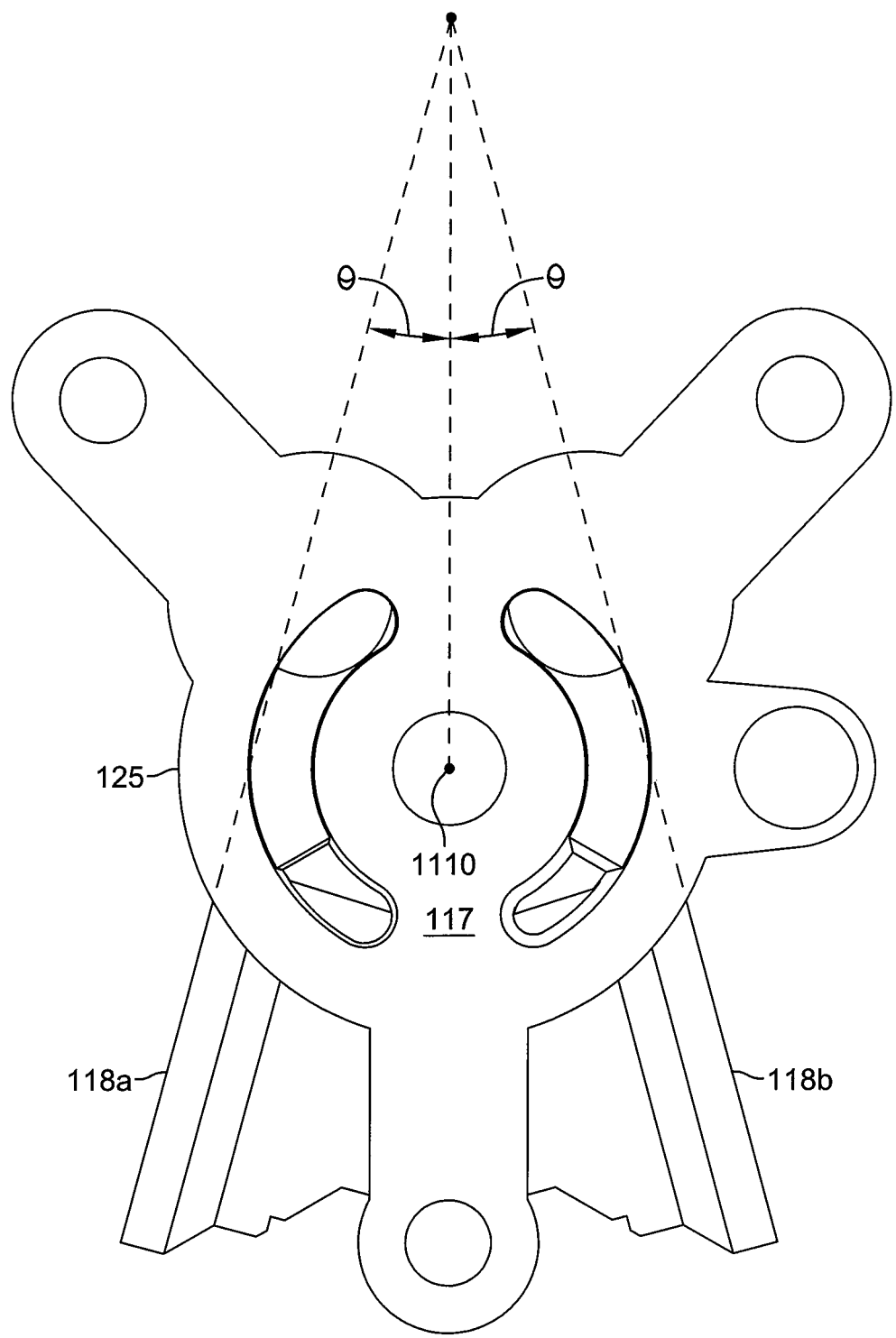
FIG. 5A is a plan view of the center section of FIG. 5, showing the relationship of the planes formed by the motor running surfaces.

In traditional single pump/dual motor designs, the motor running surfaces are normally directly opposed and parallel to one another so that motor output shafts extend perpendicular to the motor running surface in opposite directions to the driven wheels such that the two motor output shafts are parallel to one another and in most cases collinear. In the present design, center section 125 is formed such that motor running surfaces 118a, 118b are not parallel with the transaxle centerline (corresponding to line 4-4 through input shaft 110 shown in FIG. 12) or with one another. As shown in FIGS. 5 and 5A, the planes formed by the two motor running surfaces 118a, 118b are parallel to the rotational axis 1110 of the pump input shaft 110, and the plane of each motor running surface 118a, 118b remains perpendicular to its corresponding motor output shaft 130a, 130b. The rotational axes of motor output shafts 130a, 130b remain in the same plane with one another horizontally, i.e., with respect to ground, and are preferably in the same horizontal plane as the rotational axes 181 of hub assemblies 158. Center section 125 is generally symmetrical, so that these two planes are offset an equal, acute angle θ from a plane through the rotational axis 1110 of pump input shaft 110. Thus, the rotational axes of output shafts 130a, 130b form a rearward-pointing V-shape (or forward-pointing V-shape in a front-wheel drive arrangement). This arrangement allows greater tire and wheel clearance to enable a tighter turning radius as discussed in further detail later in this description.

As shown in, e.g., FIGS. 4 and 5, notch 119 is formed in center section 125 between motor running surfaces 118a, 118b. Notch 119 serves a number of useful purposes in the illustrated embodiment. First, it removes unnecessary material to decrease the weight and reduce the cost of center section 125. It also provides clearance for insertion of rear mounting screw 123 through rear extension 121 when mounting center section 125 to upper housing 112. It also provides clearance for installation of brake puck 153. Finally, it provides for additional lubrication of motor output shafts 130a, 130b, which extend through the center of motor running surfaces 118a, 118b, respectively, and out either side of notch 119, thereby exposing these ends of shafts 130a, 130b to hydraulic fluid in the sump.

As mentioned, center section 125 also features internal fluid passages 168a, 168b which allows hydraulic fluid to flow between pump running surface 117 and motor running surfaces 118a, 118b. FIG. 5 shows the arcuate openings or kidney ports in the respective running surfaces, while FIG. 6 illustrates the fluid passages and an exemplary flow path.

As illustrated, pump 120 forces hydraulic fluid into kidney port 126 and the fluid exits from kidney ports 146 present in each motor running surface 118a, 118b to motors 140a and 140b. Simultaneously, fluid enters kidney ports 147 present in each motor running surface 118a, 118b from motors 140a, 140b and exits from kidney port 127 to pump 120 to complete the basic hydraulic circuit. To illustrate the path of hydraulic fluid in the circuit, we assume that input shaft 110 rotates clockwise and swash plate 128 is tilted forward, causing compression of spring-loaded pump pistons 122 as they pass across the left kidney port 126 and releasing pump pistons 122 from compression as they pass across the right kidney port 127. This has the effect of forcing hydraulic fluid down through kidney port 126, through the previously described circuit including motors 140a, 140b, and drawing it back up through kidney port 127. In effect, the left side of pump running surface 117, and hydraulic fluid passages 168b, becomes the high pressure side while the right side of pump running surface 117, and hydraulic fluid passages 168a, becomes the low pressure side. As the present invention discloses a single pump/dual motor system, the porting is designed to provide equal pressure to both left and right hydraulic motors 140a, 140b.

Hydraulic fluid forced out of each kidney port 146 causes motor pistons 142 to extend against thrust bearings 148a, 148b (see FIG. 2), thus causing motor cylinder blocks 144a, 144b to turn their respective output shafts 130a, 130b, resulting in rearward movement of the vehicle. As mentioned previously, the hydraulic circuit completes its path as fluid is drawn into lower kidney port 147 of each motor running surface 118a, 118b, through the low pressure fluid passages, and out pump kidney port 127.

Assuming input shaft 110 is configured to rotate clockwise, a forward tilt of swash plate 128 corresponds to rearward movement of the vehicle. Conversely, a rearward tilt of swash plate 128 will cause forward movement of the vehicle, as the high pressure pump port will then become kidney port 127 and the high pressure motor ports will become kidney ports 147. This will cause motor cylinder blocks 144a, 144b to rotate in the opposite direction despite input shaft 110 still rotating in the same direction as before.

Figure 7:
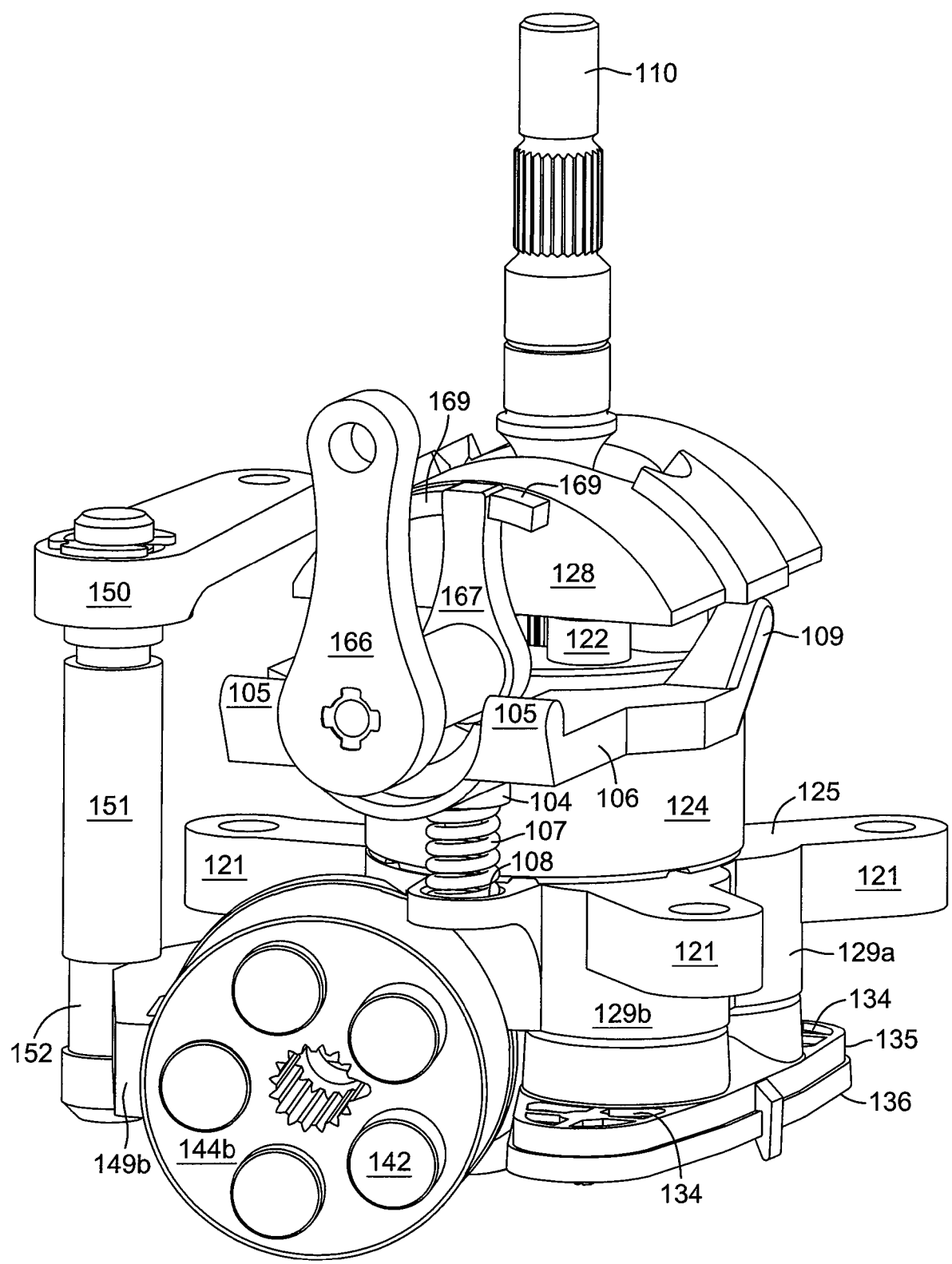
FIG. 7 is a perspective view of certain components of the transaxle of FIG. 1 with housings removed.

The tilt direction of swash plate 128, and thus the direction of vehicle travel, is controlled by pivoting the control arm 166 which is engaged to trunnion arm 167 which is in slidable engagement with protrusions 169 formed on swash plate 128 as illustrated in FIGS. 3 and 7. Control arm 166 may be connected by a linkage (not shown) to an operator control (not shown). Optionally, control arm 166 or simply the horizontal shaft portion of trunnion arm 167 (which protrudes through housing 112) may be linked or engaged to either a linear or rotary electric actuator which is controlled by the operator. Regardless of the control method employed, in the embodiment shown, when control arm 166 is rotated fore or aft, trunnion arm 167 is also rotated fore or aft.

Referring again to FIGS. 3 and 7, trunnion arm 167 is shown centered between two protrusions 169 formed in swash plate 128. As trunnion arm 167 is rotated forward, it pushes against the forward protrusion 169, causing swash plate 128 to arcuately slide forward. As trunnion arm 167 is rotated rearward, it pushes against the rearward protrusion 169, causing swash plate 128 to arcuately slide rearward. The upper arcuate surfaces of swash plate 128 slide against arcuate cradle bearings (not shown) which are mounted in upper housing 112 or, optionally, against appropriate arcuate bearing surfaces formed integrally on housing 112. The rotational axis of trunnion arm 167 is not collinear with the rotational axis of swash plate 128. This axial offset allows a larger angular movement of trunnion arm 167 compared to a smaller angular movement of swash plate 128, thus providing more precise control of the output of pump 120. This axial offset causes the line of contact between trunnion arm 167 and swash plate 128 to move radially as control arm 167 and swash plate 128 are rotated through their control arcs. To accommodate this relative motion between the trunnion arm and swash plate, prior trunnion arm designs, such as that illustrated in U.S. Pat. No. 6,701,825 utilized a more complex arrangement involving a slider block and vertical protrusions forming a slot on the side of the swash plate in which the slider block travels linearly when the swash plate is pivoted. The teachings of this prior art patent are incorporated herein by reference. The present invention eliminates the complexity of this prior design, thereby reducing material requirements and cost.

In the present invention, protrusions 169 must have sufficient depth in the vertical direction of FIG. 7 to account for the relative motion between trunnion arm 167 and swash plate 128 when they pivot. In addition, protrusions 169 are positioned apart far enough to allow for relative movement and angular skew between each protrusion 169 and the respective adjacent surface of trunnion arm 167 during rotation. The size of these gaps will affect the angular width of the neutral dead band through which trunnion arm 167 can rotate without causing movement of swash plate 128. As a result of the requisite gaps, the present design may result in a wider apparent neutral band than one using a slider block.

Figure 7A:
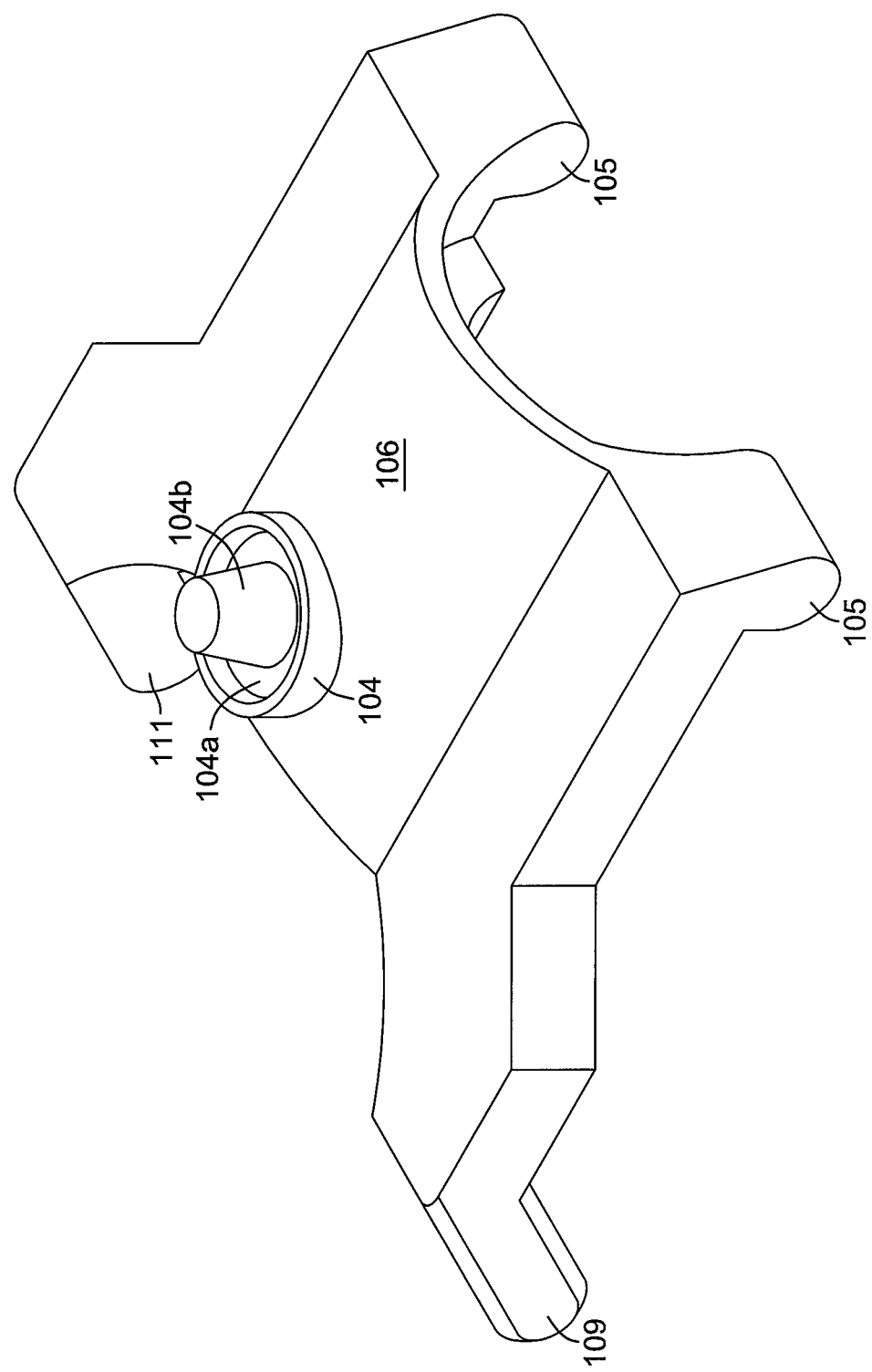
FIG. 7A is a perspective view of the pivot plate for a return-to-neutral feature.

Internal RTN pivot plate 106, shown in FIGS. 3, 7 and 7A, is pivotably supported by engagement of the curved surface of pivots 105 with arcuate recesses (not shown) formed in upper housing 112 and is also supported by RTN spring 107, which is supported and captured at one end by spring seat 108 of center section 125 and is captured at its other end by spring seat 104 formed on pivot plate 106. As seen most clearly in FIG. 7A, spring seat 104 may optionally include a recess 104a and projection 104b to assist in assembly and retention of spring 107. RTN pivot plate 106 comprises front fork tine 109 and rear fork tine 111, which extend around pump cylinder block 124 and upward toward the front and rear lower surfaces of swash plate 128, respectively. RTN pivot plate 106 is positioned by housing 112 and RTN spring 107 such that, when swash plate 128 is in the neutral position as shown in FIGS. 3 and 7, the distal ends of both tines 109 and 111 are in contact with swash plate 128. As swash plate 128 is arced forward, swash plate 128 remains in contact with front tine 109 only, and plate 106 is pivoted downward, thereby compressing RTN spring 107 against spring seat 108. Similarly, when swash plate 128 is arced rearward, swash plate 128 remains in contact with rear tine 111 only, and plate 106 is pivoted downward and RTN spring 107 is compressed against spring seat 108. The spring force of spring 107 is sufficient to return RTN mechanism 106 and swash plate 128 to their neutral positions when rotational force is removed from trunnion arm 167, thereby causing transaxle 100 to automatically return to a neutral drive state. This symmetrical, dual-tined RTN mechanism is equally effective when returning swash plate 128 to neutral from either a forward or reverse position since the range of forces applied by compressed RTN spring 107 will be approximately the same with one another when swash plate 128 is rotated to either side of the neutral position.

It will be apparent that the design of the internal RTN mechanism of transaxle 100 provides for a positive RTN force that will bring the vehicle to a full neutral position despite the free play between trunnion arm 167 and swash plate 128 and the resulting neutral dead band (which is operator controlled) discussed above. Because of this free play, an RTN mechanism or function connected directly to control arm 166 or trunnion arm 167 would slow the vehicle, but might leave it in a slow creep in either a forward or reverse direction. However, because both tines 109 and 111 are in constant and direct contact with swash plate 128 in the neutral position, this dead band has no effect on the RTN functionality.

Another safety feature enabled by the present invention is the braking feature best illustrated in FIGS. 3 and 4. Brake arm 150 extends away from upper housing 112 as seen in FIG. 1, so that it may be mechanically linked to operator controls (not shown). Brake arm 150 connects to one end of brake actuation shaft 151, which is contained within a bore in upper housing 112. Integrally-formed cam 152 of shaft 151 engages brake puck 153. When brake arm 150 is pivoted, shaft 151 and integral cam 152 are also pivoted to actuate brake puck 153, pressing it forward. Brake puck 153 has left and right extensions 149a, 149b, each having a braking surface aligned with an outer surface of one of the two motor cylinder blocks 144a, 144b. Thus, as brake arm 150 is rotated, brake puck extensions 149a, 149b press against the respective motor cylinder blocks 144a, 144b to help prevent their rotation. In this manner, a single brake is used to brake both hydraulic motors 140a, 140b.

It should be noted that, as illustrated (and though not necessarily drawn to scale), this brake feature is ideally used as a static parking brake rather than a dynamic brake. Based on the illustrated size of the braking surfaces of brake puck extensions 149a, 149b, motor cylinder blocks 144a, 144b will likely continue to turn if the vehicle is in drive or reverse despite actuation of brake puck 153. This is, in part, because the interfacing components are suspended in a bath of hydraulic fluid which reduces the friction coefficient. However, if brake puck 153 is engaged while the vehicle is at rest, it will require a significant increase in hydraulic pressure to overcome inertia and begin rotating motor cylinder blocks 144a, 144b. Accordingly, the brake feature in the illustrated embodiment will provide enough braking force to keep the vehicle from rolling forward or in reverse from a stopped position when the transaxle is at or near its neutral position. If dynamic braking is desired, it will be understood that the contact area of brake assembly mating surfaces can be increased to enhance braking functionality.

Figure 8:
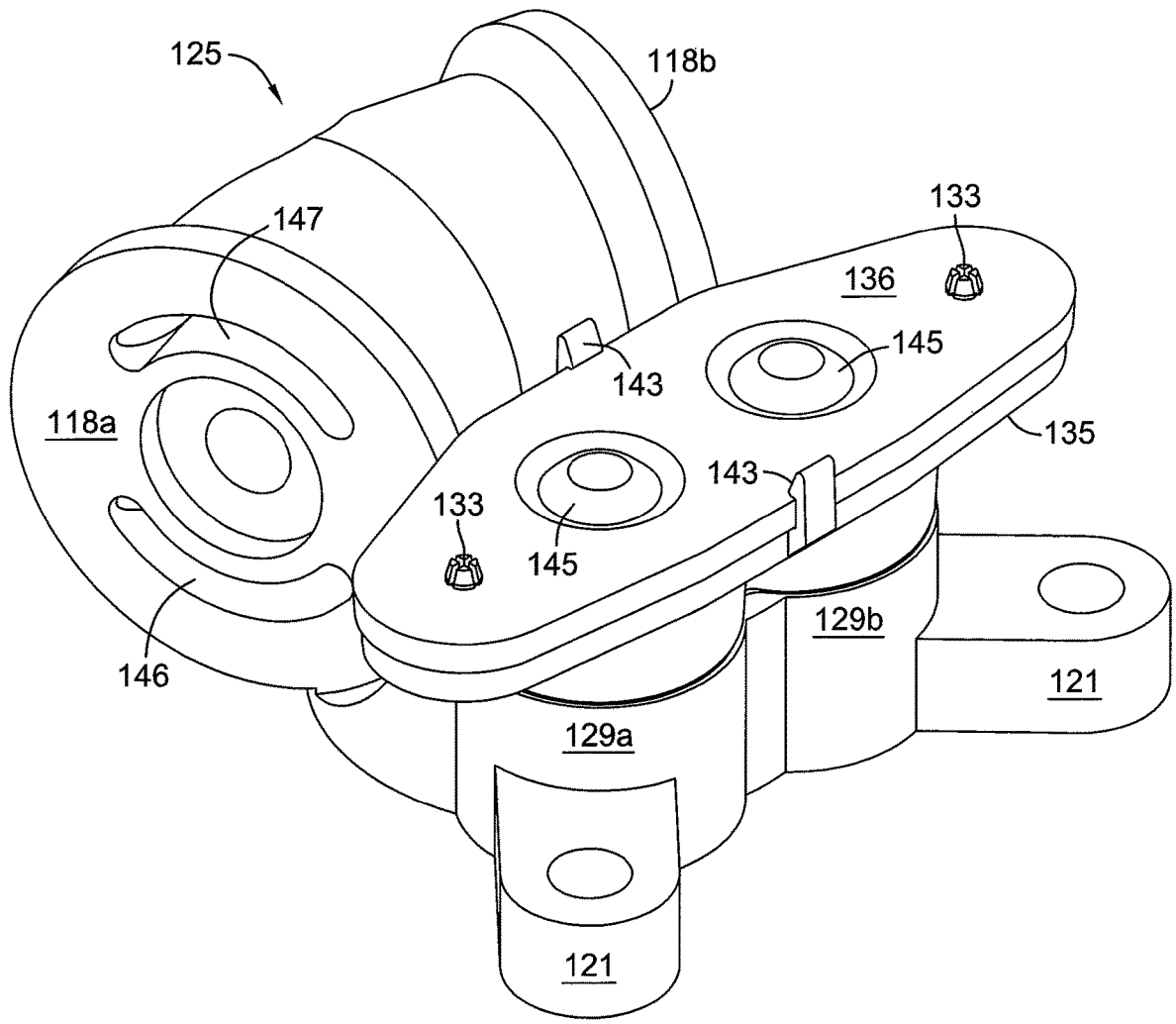
FIG. 8 is a bottom perspective view of the center section and filter assembly of the transaxle of FIG. 1.

Check valves are provided to enable fluid to enter the hydraulic circuit from the sump to account for leakage from the hydraulic circuit. Referring primarily to FIGS. 4, 7, 8 and 9, threaded receptacles 129a, 129b beneath pump running surface 117 receive a pair of threaded check valves 137a, 137b, which secure filter casing 135 to center section 125. Metal washers 165 may be molded into filter casing 135 as shown, during manufacture of casing 135 (or separate washers may be provided), to allow torquing of check valves 137a, 137b without damaging casing 135, which may be formed from an appropriate plastic material. Casing cover 136, which also may be formed from an appropriate plastic material, is then snapped over retention posts 133 and is further gripped by retention clips 143 extending from filter casing 135. FIG. 8 shows these elements assembled to center section 125. The location and quantity of posts 133 and clips 143 may be varied as needed to optimize the illustrated design.

Each check valve or check plug 137a, 137b may be of identical construction, comprising a central bore 138 through which hydraulic fluid may pass. Within each bore 138 is a conventional ball and spring assembly (springs not shown—balls illustrated in closed position) which serves as a check valve to allow fluid to flow into center section 125, but prevents fluid from escaping. Each receptacle 129a, 129b is connected, through porting, with one of kidney ports 126 or 127 on pump running surface 117, i.e., receptacle 129a connects to kidney port 126 and receptacle 129b connects to kidney port 127. Thus, when swash plate 128 is tilted, and depending on the direction of the tilt of swash plate 128 as described above, one of the receptacles will be at high pressure and one will be at low pressure, with the check valve at low pressure opening to permit fluid flow into that side of the circuit and with the check valve at high pressure closing to prevent escape of the pressurized fluid back into the sump.

Hydraulic fluid may be released from a closed, pressurized check valve 137a or 137b through a small opening or bleed 132 provided in one or both check valves. The main reasons for providing bleeds 132 are to increase the width of the neutral band and to provide a smoother transition from neutral to forward or reverse, which translates to a smoother acceleration of a vehicle, but with some power loss and some heat gain due to reduced pump efficiency. Vehicle manufacturers may specify various check plug combinations, such as bleed in reverse and no bleed in forward, for example. Fluid exiting from a bleed 132 will at times be under high pressure and could damage cover 136. To prevent this, casing cover 136 may comprise fluid deflectors 145 positioned adjacent to each check valve 137a, 137b to deflect the high pressure fluid flow from bleeds 132. Deflectors 145 may be integrally formed on cover 136, as shown.

Figure 9:
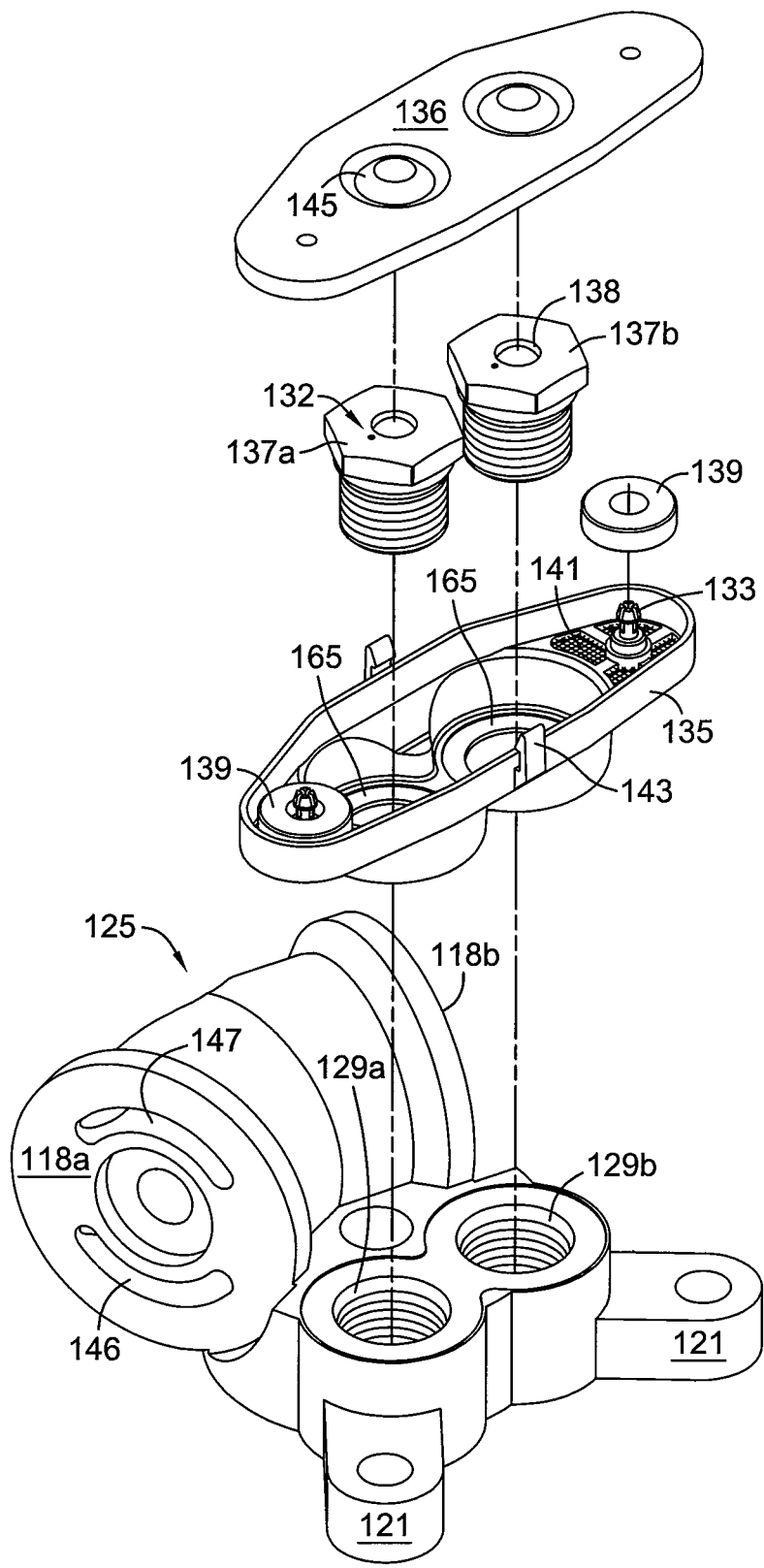
FIG. 9 is an exploded bottom perspective view of the center section and filter components of FIG. 8.

Fluid enters filter casing 135 from sump through openings 134 surrounding each retention post 133, as shown in FIGS. 3, 7 and 9. Each fluid intake opening 134 is covered by a mesh filter 141. One or two optional magnets 139 may be positioned on posts 133 so they are held in place when cover 136 is attached to casing 135. Magnets 139 attract and remove ferrous metal filings or particles that may be present in the hydraulic fluid due to manufacturing processes and normal wear. Though casing cover 136 should fit snugly onto filter casing 135, it need not create a seal, and some entry of fluid into the system between the two elements is generally not a concern.

Figure 11:
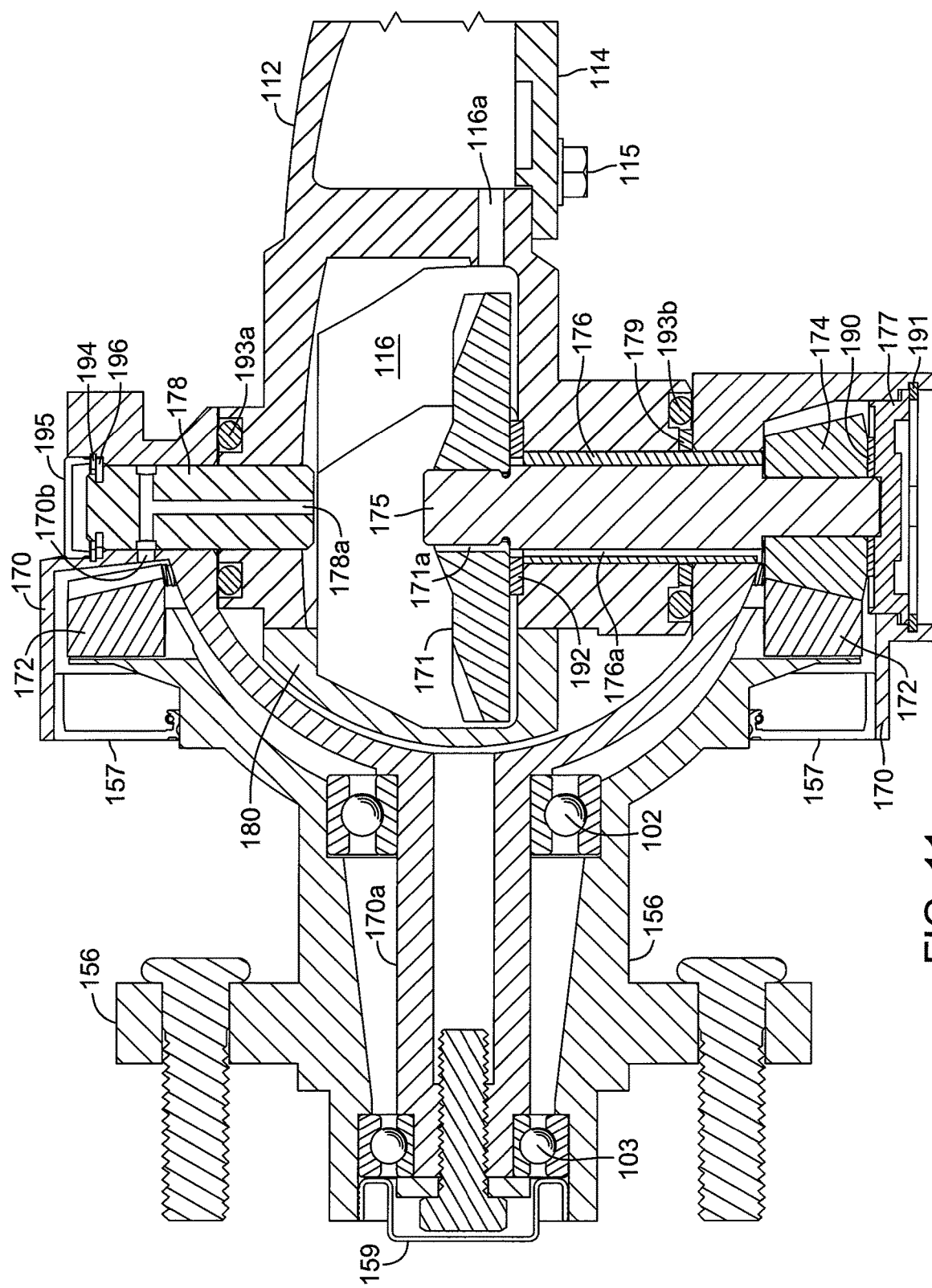
FIG. 11 is a cross-sectional view along the line 11-11 of FIG. 12 with the pinion gear removed for clarity.

The distal end of each motor output shaft 130a, 130b is attached to a gear train which transfers torque to the wheels 161. The two gear trains are preferably identical in construction and operation and, therefore, the elements of each are given the same numbers in this description and the drawings. Each gear train comprises pinion gear 131, upper bevel gear 171, lower bevel gear 174, and hub gear 172, as shown, e.g., in FIG. 3. These names are given for descriptive use only, and in no way are intended to limit the size, shape, or location of the gears in alternative embodiments. Pinion gear 131 is engaged with splines on the end of each shaft 130a or 130b and drives upper bevel gear 171. Upper bevel gear 171 is similarly engaged with splines on a first end of gear shaft 175, while lower bevel gear 174 is engaged with splines on the opposing end of shaft 175. Accordingly, bevel gears 171 and 174 turn in unison. Lower bevel gear 174 drives hub gear 172 as shown in FIGS. 3 and 11. Hub gear 172 in turn rotates hub 156 about rotational axis 181 of the integrally-formed axle 170a of hub gear housing 170, by aligning and engaging ribs 173 that are radially arrayed on its outer face with corresponding grooves 183 formed on the inner face of hub 156. Finally, hub seal 157 and hub cap seal 159 may be secured in a conventional manner to complete the hub assembly. In the illustrated embodiment, hub 156 rotates, but axle 170a does not. Inner and outer axle bearings 102, 103 are provided to rotatably support hub 156.

Figure 10:
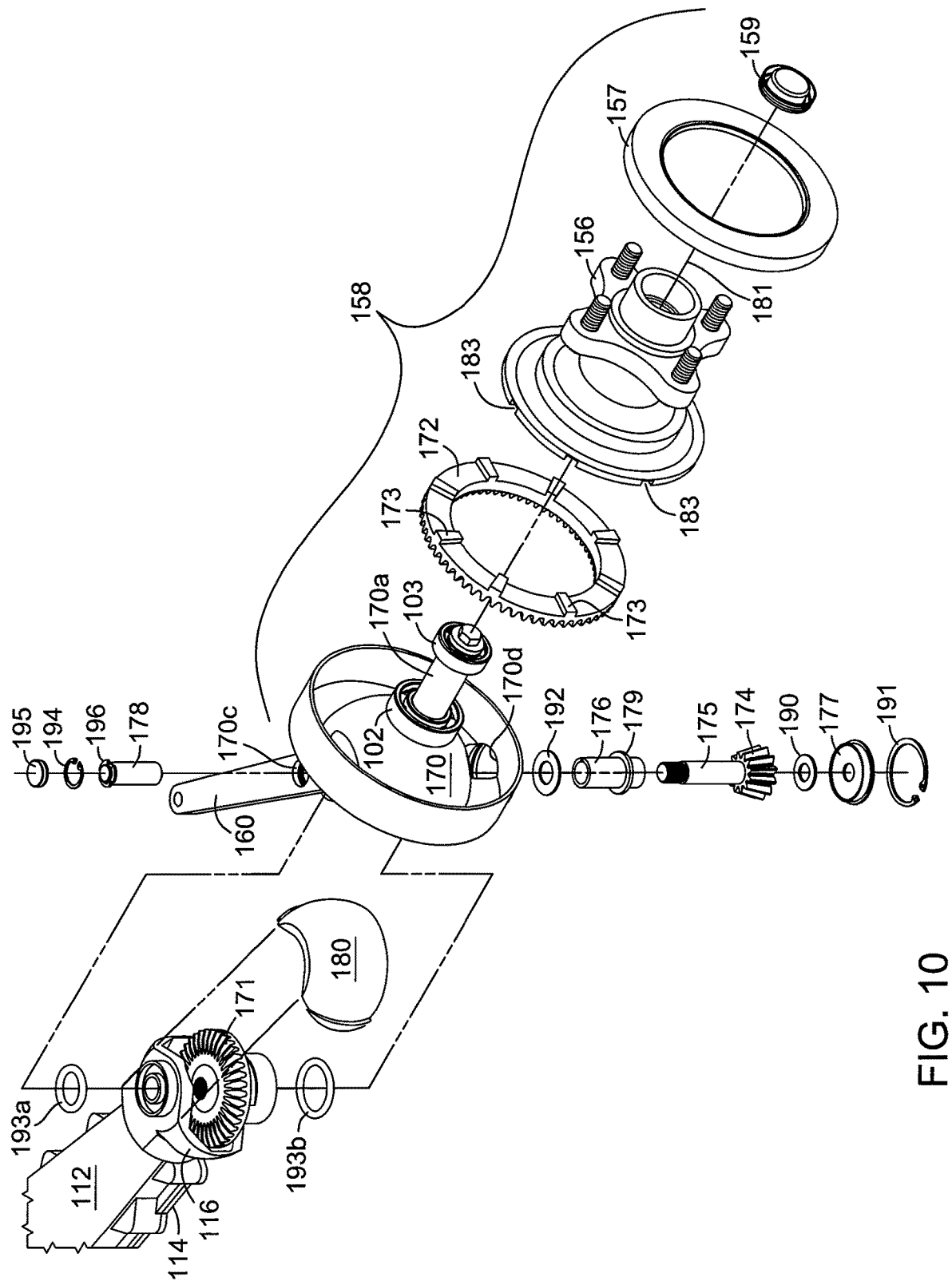
FIG. 10 is an exploded perspective view of a hub assembly and associated gear train of the transaxle of FIG. 1.

As shown most clearly in FIGS. 10 and 11, a complex pivot joint allows hub assembly 158, comprising hub 156, hub gear 172 and hub gear housing 170, to pivot (along with a vehicle wheel, tire, etc., as required, attached to each hub 156) during a vehicle turn. FIG. 10 displays the elements of the pivot joint in an exploded view while FIG. 11 shows it assembled in a sectional view. An end of upper and lower housings 112 and 114 is seen extending from the upper left corner area of FIG. 10. On the end of housing 112 is formed a bevel gear housing 116 which contains upper bevel gear 171 and is sealed by end cap 180. In an alternate embodiment (not shown) gear housing 116 may be a separate component attached to housing 112. Though output shaft 130a and associated pinion gear 131 are occluded by upper housing 112 in FIG. 10, it will be understood that these components rotate upper bevel gear 171 either clockwise or counter-clockwise depending on the output of hydraulic motor 140a.

As seen most clearly in FIG. 11, upper bevel gear 171 rotates on upper washer 192, which provides a bearing surface for gear 171. Sleeve 176 serves as a journal bearing for shaft 175, and, in combination with pivot pin 178, joins gear housing 116 of upper housing 112 with hub gear housing 170. Shaft 175 is inserted through sleeve 176 to engage with gear 171. Shoulders formed on shaft 175 locate shaft 175 in relation to gears 171 and 174. Below the lower pivot joint is thrust washer 190 which provides a bearing surface for gear 174. End cap seal 177 in turn provides support for washer 190 and seals the assembly access cavity at the bottom of housing 170. Retaining ring 191 retains seal 177 against thrust loading from gear 174.

In the illustrated embodiment, various sump fluid passages are provided to ensure adequate sump fluid communication between sump cavities in hub assemblies and the central sump cavity formed by the joined housings 112 and 114. For example, passage(s) 116a may be provided at each end of the central sump cavity to enable sump fluid communication with bevel gear housings 116. Groove(s) 171a may be formed in gears 171 to communicate with groove(s) 176a formed in sleeves 176 to provide fluid passage(s) for sump fluid to enter the hub cavities to lubricate gears 172, 174 and axle bearings 102, 103 housed therein and also to ensure lubrication of shaft 175. A T-shaped passage and annulus 178a may be formed in pivot pin 178 to enable fluid communication with a passage or opening 170b formed in hub gear housing 170. Additional sump fluid passages (not shown) or passages formed differently to achieve the same function as those shown may be provided, as needed.

O-ring seals 193a, 193b seal the upper and lower pivot interface between housings 116 and 170 to prevent leakage of sump fluid from these joints. Washer 179 is provided at the lower pivot interface and could be provided at the upper interface, as well, to help prevent excessive wear. Washer 179 may be fabricated from special material(s), such as DU bushing material to increase service life of the pivot joint. Alternatively, DU bushings could be installed either in lieu of washers or in addition to washers at one or both of these pivot joints.

Pivot pin 178 is positioned coaxially above shaft 175. Retaining ring 196 is first assembled onto pivot pin 178, which is then installed through opening 170c in housing 170 and then through the aligned upper opening in gear housing 116 to form the upper pivot joint. Retaining ring 194 is then installed in order to sandwich retaining ring 196 between it and housing 170 so that pivot pin 178 does not move axially.

Finally, upper seal 195 is installed to seal opening 170c. Certain details of this pivot joint may be altered to achieve the same end result. For example, a ridge or ring could be formed integrally on pin 178 to replace retaining ring 196. It will be understood that this pivot joint and the associated components exist in mirror image on either side of transaxle 100.

Thus, hub assembly 158 comprising hub gear 172 and hub gear housing 170 pivots along with vehicle wheel 161 as directed by force applied to steering arm 160, which may be integrally formed with housing 170, as shown, or attached separately. As hub gear 172 pivots about the end of transaxle 100, it does not lose contact with lower bevel gear 174, which protrudes through opening 170d at the bottom of hub gear housing 170 to drive gear 172.

Figure 12:
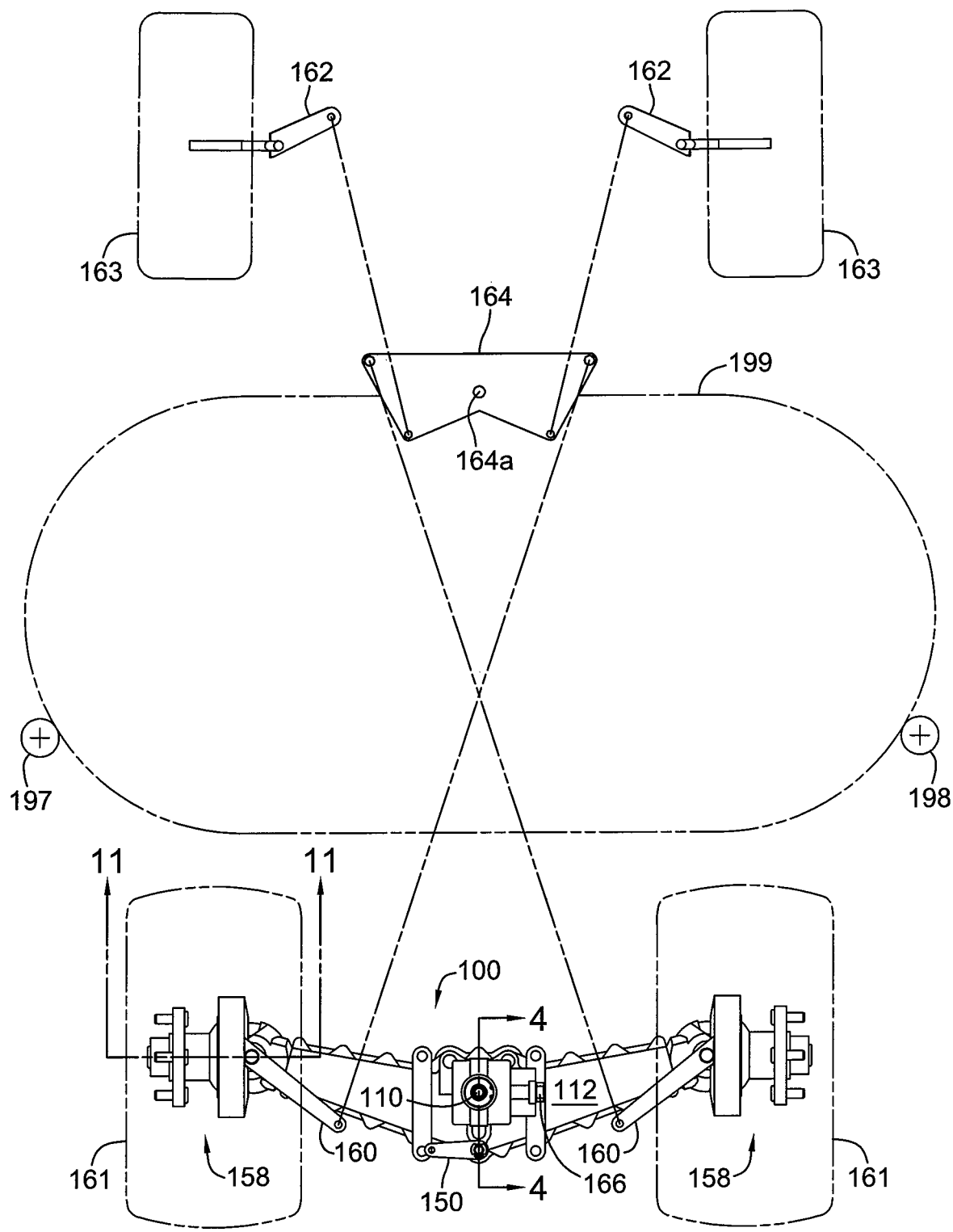
FIG. 12 is a representational top plan view showing the transaxle of FIG. 1, wheels and schematic steering linkages on a four-wheel steer vehicle.
Figure 13:
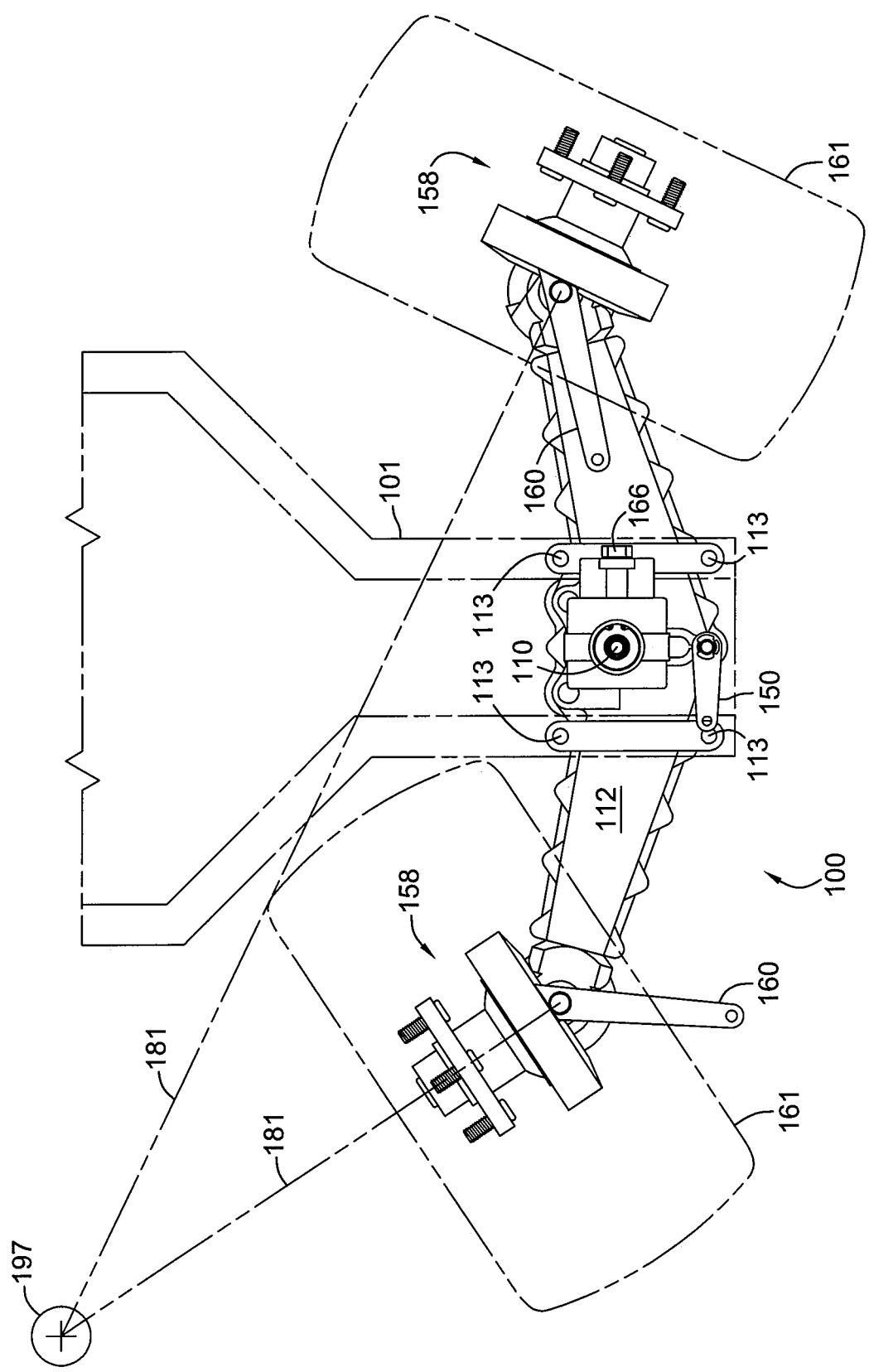
FIG. 13 is a representational top plan view showing the transaxle of FIG. 1 with wheels shown in a full left turn.

The utility provided by the pivot joint, and moreover by the ability to pivot wheels driven by a transaxle, is more fully appreciated by viewing FIGS. 12 and 13. FIG. 12 shows a top view of a steering linkage system of a lawn tractor with linkages represented by straight phantom lines. Front wheels 163, rear wheels 161 and mowing deck 199 are also represented. Rear steering arms 160 are shown connected to front attachment points of steering plate 164, while front steering arms 162 are connected to rear attachment points on steering plate 164. The vehicle operator causes steering plate 164 to rotate about central pivot point 164a to simultaneously steer all four wheels to enable the vehicle to turn about a small circle tangent to mowing deck 164 represented by circle 197 during a tight left turn and by circle 198 during a tight right turn. Plate 164 is rotated clockwise to turn left and counterclockwise to turn right. Actual mechanical steering linkages must normally accommodate various other vehicle layout constraints and very likely will not be straight lines as shown. However, the illustration is helpful to show how all four wheels can be manipulated concurrently while transaxle 100 drives rear wheels 161. Also illustrated is the ability of a vehicle such as a lawn tractor, equipped with transaxle 100, to travel tangent to and in a continuous circular path about a small diameter object such as a small tree or pole, represented by circles 197 and 198, without scuffing tires, turf, etc.

FIG. 13 shows a top view of a portion of vehicle frame 101 and transaxle 100 utilizing the steering linkage system shown in FIG. 12 with attached rear wheels 161 represented in a full left turn about circle 197. As is apparent, the wheels are not both pivoted to the same degree in the illustrated four-wheel steering linkage system. Rather, Ackerman steering geometry principles are employed in the illustrated steering layout such that the inside wheel during the turn is pivoted at a greater angle than the outside wheel since it has a shorter turning radius than the outer wheel. The axis of each wheel is focused on the center of turning circle 197 during the full left turn illustrated.

The degree to which wheels can be pivoted to enable a tight turning radius may be limited by clearance between a vehicle's wheels and the vehicle frame structure and/or between its wheels and transaxle. By orienting the motor output axes in a V-shaped configuration as shown and locating the transaxle mounting points in a relatively narrow grouping near the vehicle centerline, these clearance issues are significantly reduced and mounting of the transaxle to a vehicle frame, such as the generically illustrated frame 101, can be accomplished.

Finally, though the preceding description and associated figures have primarily described and disclosed the present invention as used to drive the rear wheels of a vehicle, it will be understood that transaxle 100 may be used in other vehicle arrangements to drive the front wheels of such a vehicle, and may be used to drive opposed wheels on any appropriate vehicle having two or more wheels.

In another vehicle arrangement (not shown), two opposed transaxles 100, one at the front of the vehicle and one at the rear of the vehicle, each with its previously described V-shaped configuration pointing away from vehicle center, could be driven and steered to facilitate tight turn radius, four wheel drive capability on the vehicle.

In yet another vehicle arrangement, the angle of the previously discussed V-shaped configuration that is determined by the geometry of center section 125 may be increased or decreased to accommodate specific vehicle layout constraints.

Where greater ground clearance is desired, center section 125 may also be formed to create an angle between motor running surfaces 118a, 118b such that the surfaces are tilted as illustrated herein, but are also tilted downward, causing output shafts 130a, 130b to extend from center section 125 in a downward sloping diagonal direction as they extend toward vehicle wheels 161. This design variation would effectively raise center section 125 relative to the ground.

An alternative embodiment of a steerable transaxle 200 is depicted in FIGS. 14-21, where elements similar to those in the prior embodiment are depicted with similar numerals, but with the prefix "2." Only those elements that differ materially from the prior embodiments will be described in detail.

Figure 14:
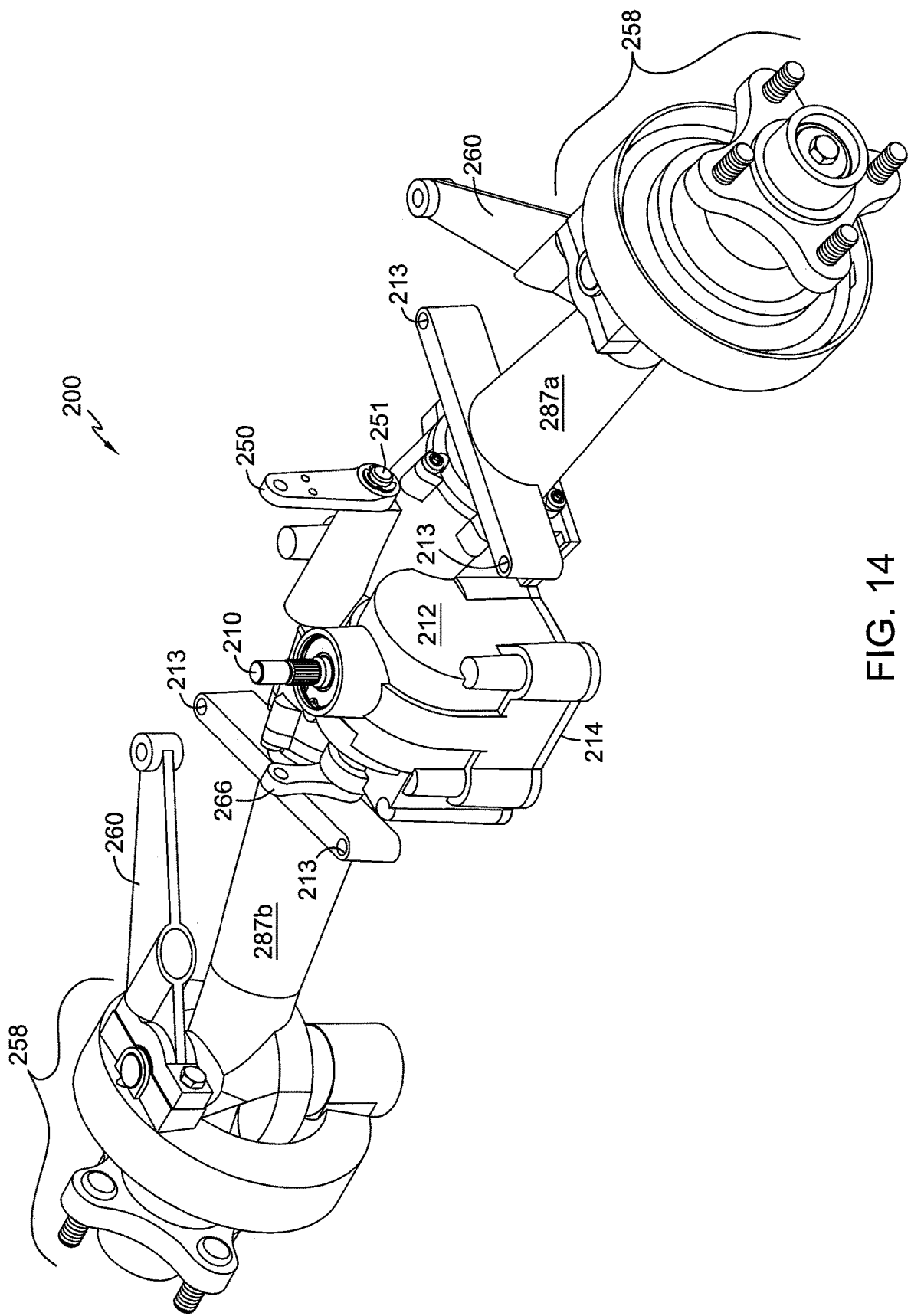
FIG. 14 is a perspective view of a steerable transaxle according to a second embodiment of the invention.
Figure 15:
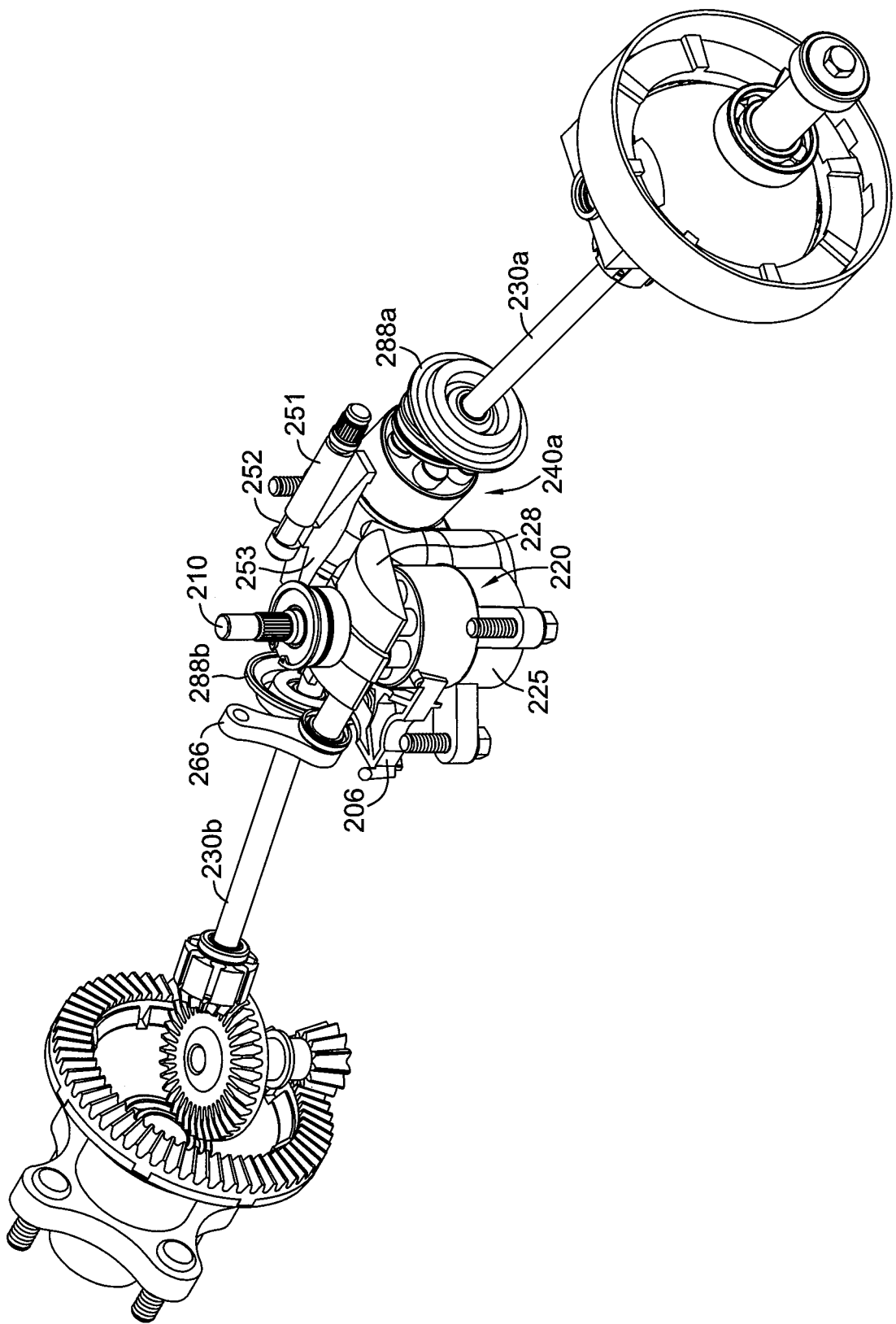
FIG. 15 is a perspective view of the transaxle of FIG. 14 with housings and certain other components removed to illustrate internal components of the transaxle.
Figure 16:
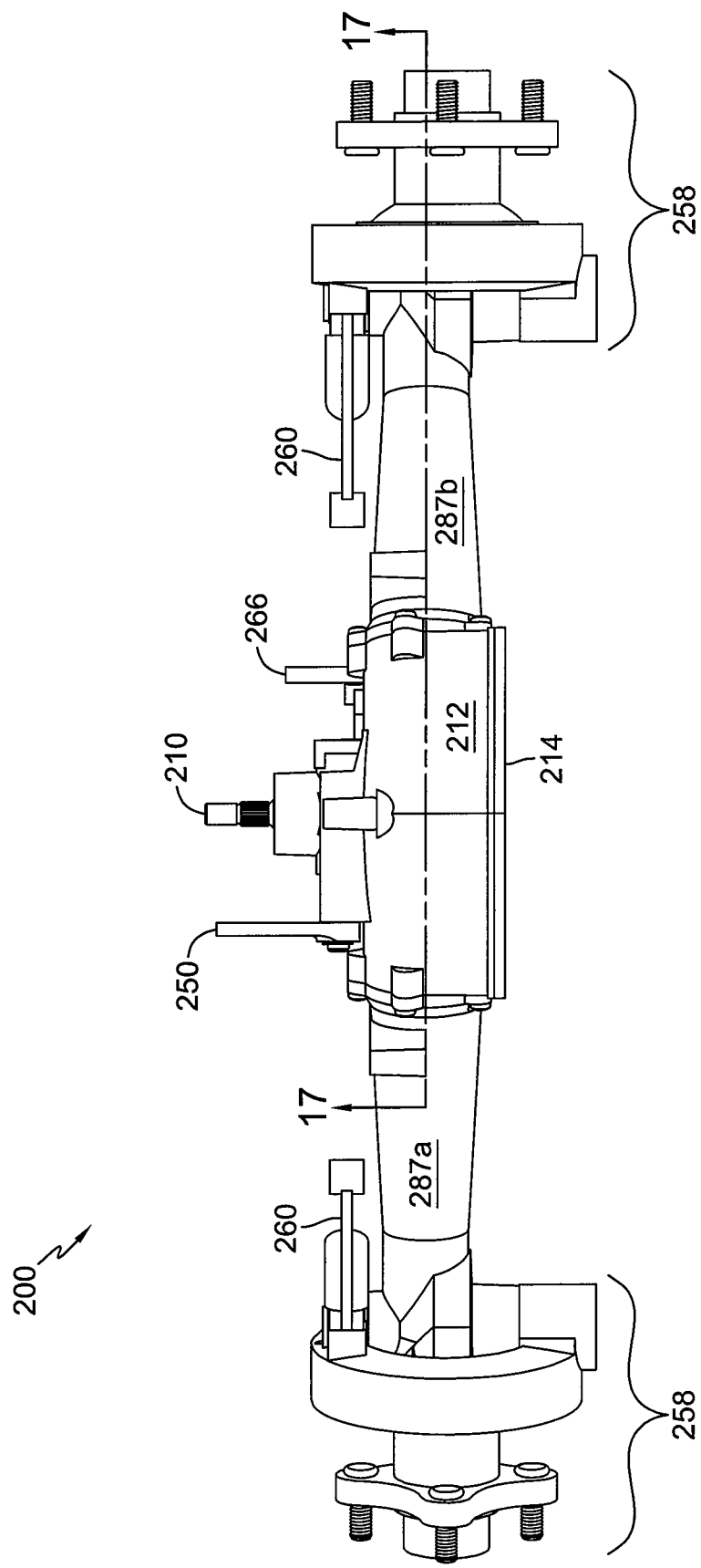
FIG. 16 is an elevational view of the transaxle of FIG. 14.
Figure 17:
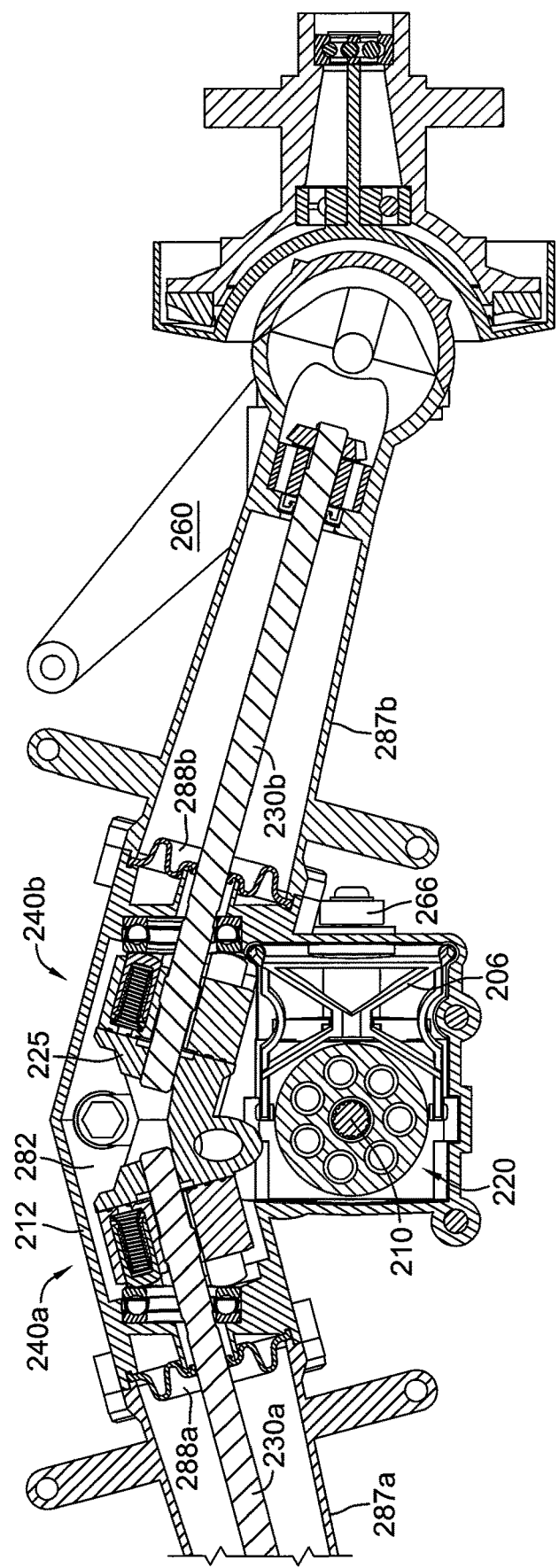
FIG. 17 is a cross-sectional plan view of a portion of the transaxle of FIG. 14, along the line 17-17 of FIG. 16.
Figure 18:
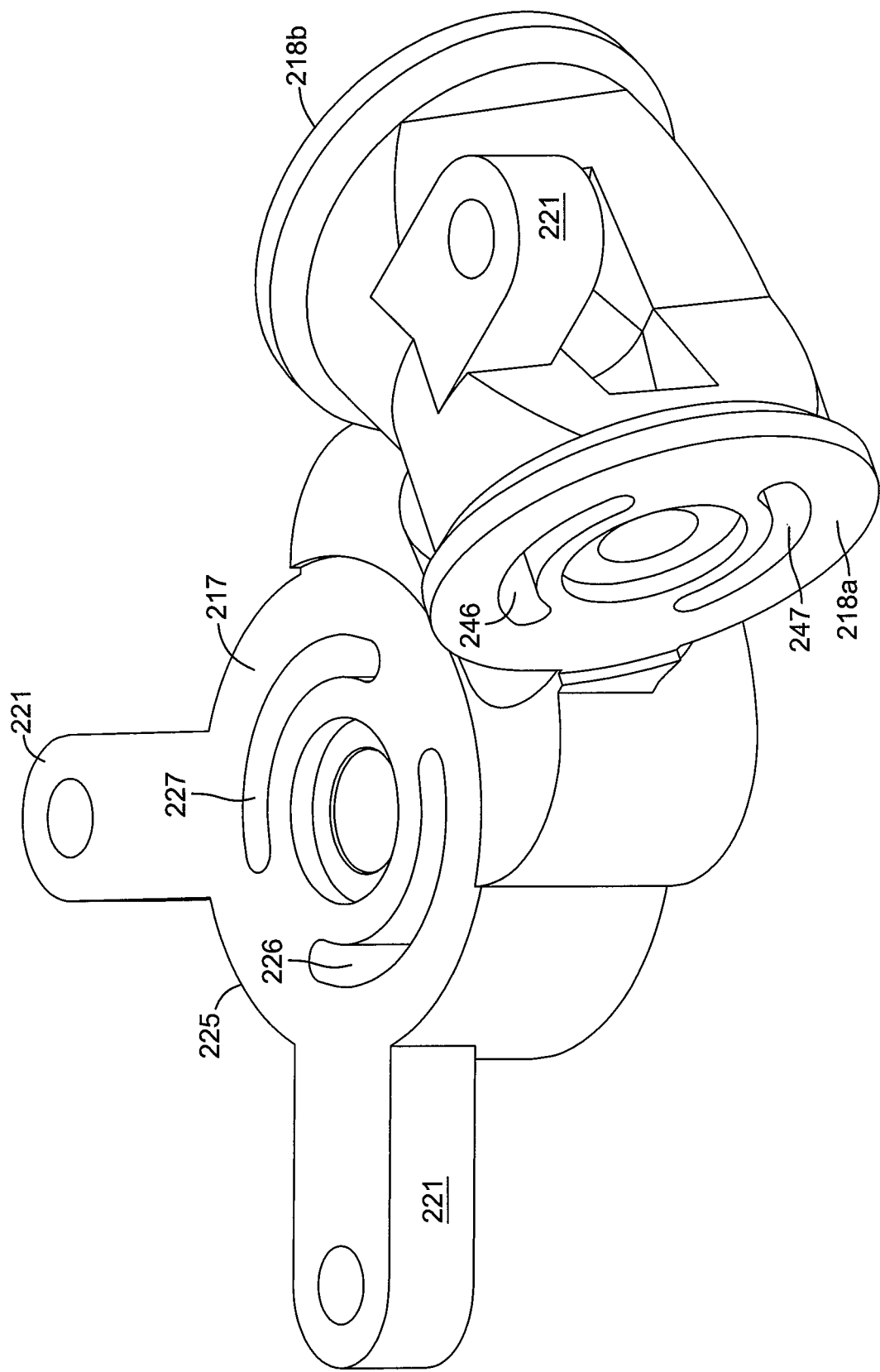
FIG. 18 is a perspective view of the center section used in the transaxle of FIG. 14.
Figure 19:
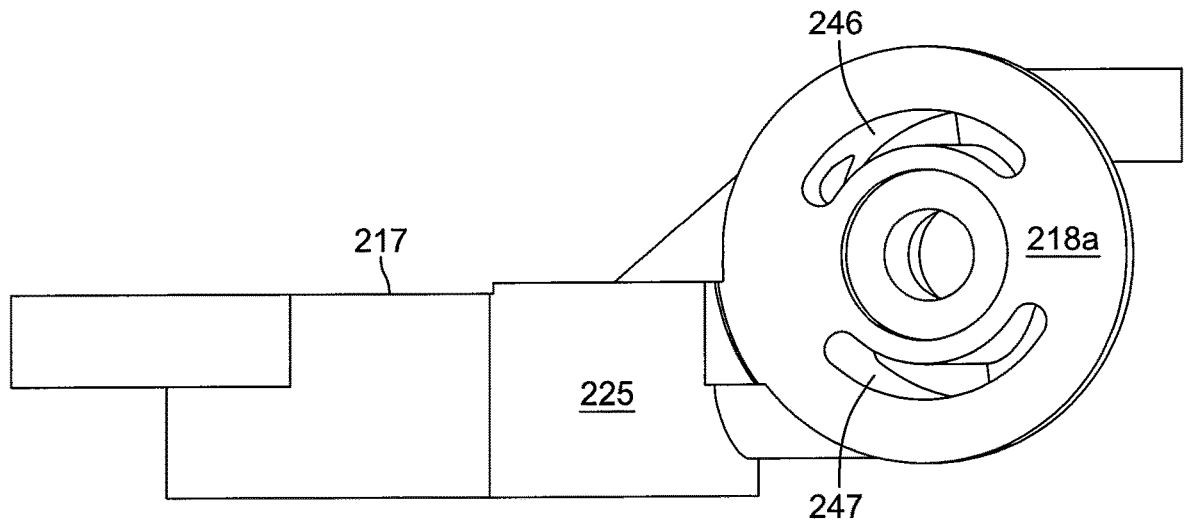
FIG. 19 is a side elevational view of the center section of FIG. 18.
Figure 20:
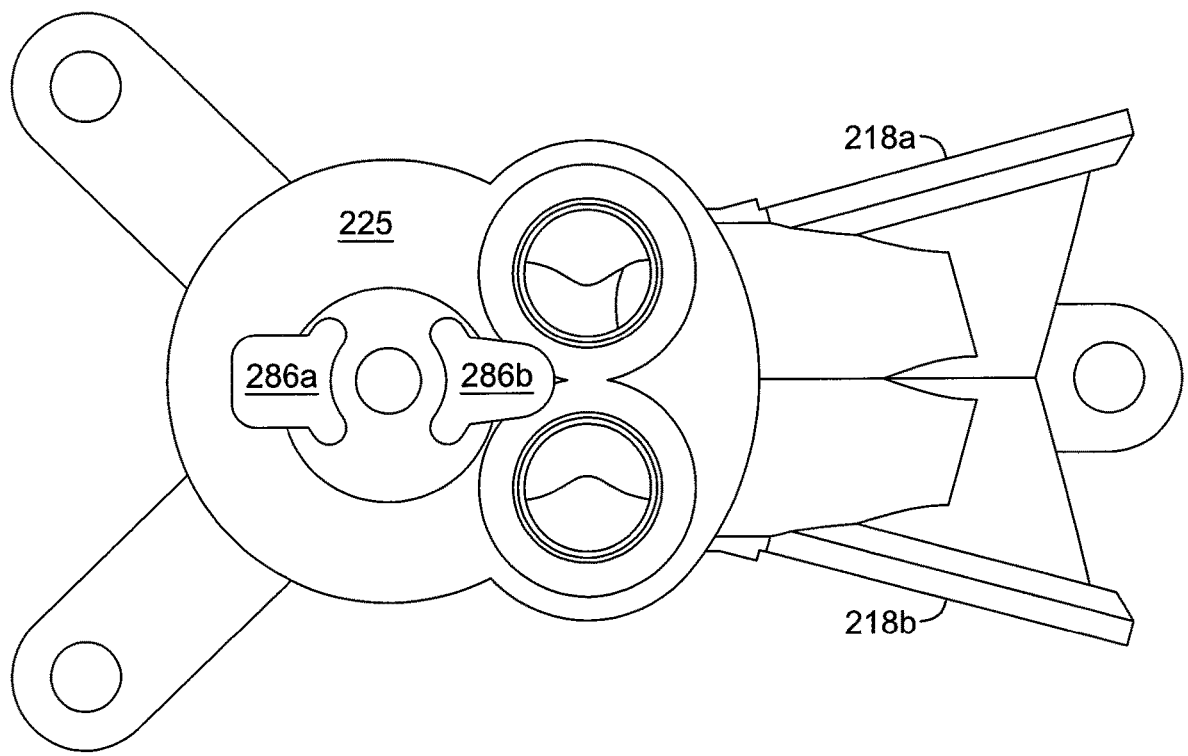
FIG. 20 is a bottom plan view of the center section of FIG. 18.
Figure 21:
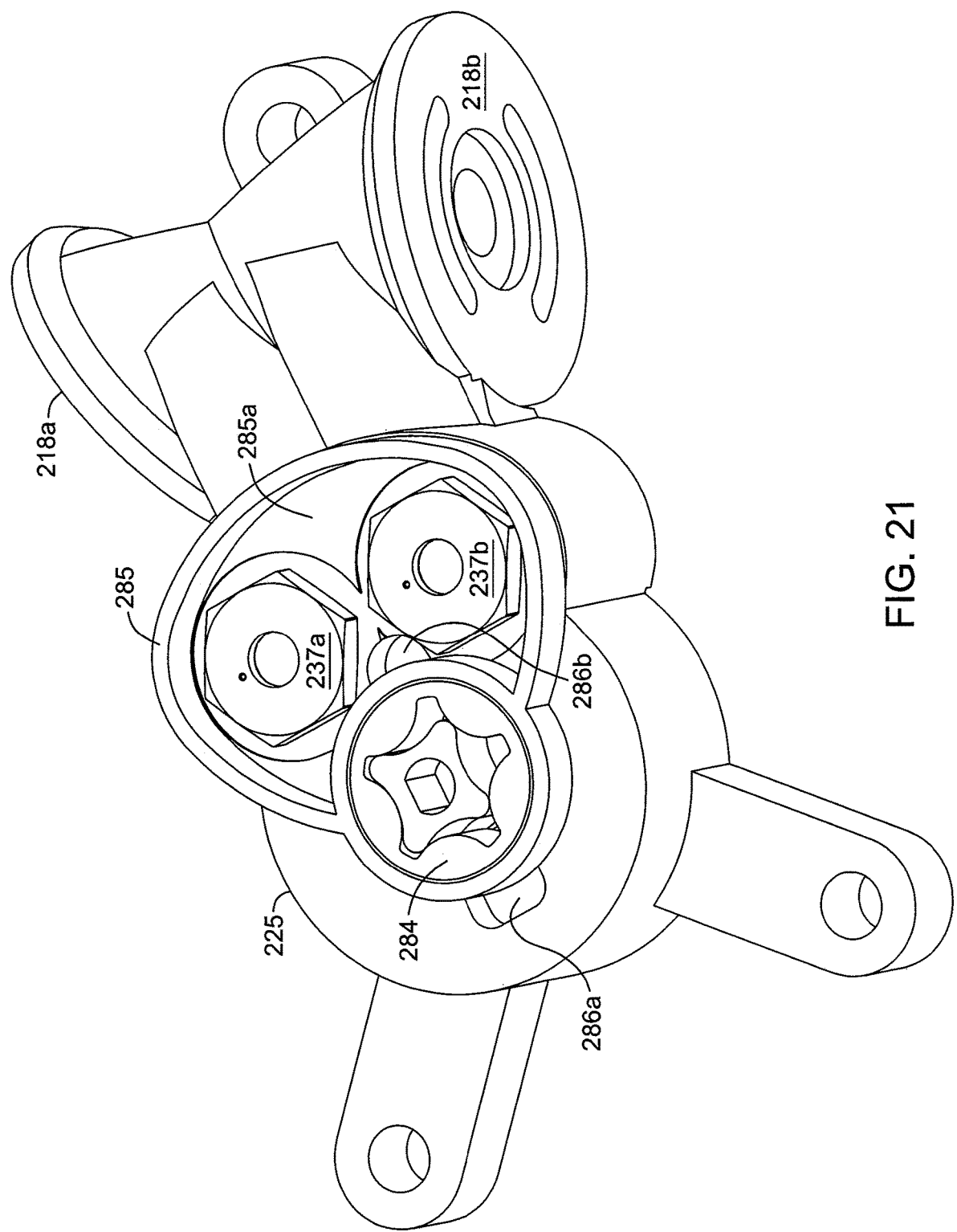
FIG. 21 is a bottom perspective view of the center section of FIG. 18, also depicting certain elements of a charge pump system.

As seen most clearly in FIGS. 14 and 16, a pair of output shaft housings 287a, 287b are secured to opposite ends of transmission upper housing 212 at respective joint surfaces, so that the transmission sump 282 is segregated from the internal volumes of housings 287a and 287b. Flexible bellows 288a, 288b can be used between these two regions to permit the oil in sump 282 to expand as needed during operation. It will be understood that air vents may be incorporated into housings 287a, 287b if needed.

Hub assemblies 258 may be the same as the previously described hub assemblies 158 and will therefore not be described in detail, although it will be noted that steering arms 260 are shown as being connected thereto by means of screws.

As will be understood, a pulley (not shown) would generally be mounted on pump input shaft 110/210 to provide power to the transmission from the prime mover (not shown). A benefit of the alternative embodiment is that it provides a lower height for the pump, thereby permitting a lower pulley. This provides greater flexibility in the mounting of transaxle 200 in a vehicle.

This lower height is achieved by a modified center section 225 such as is depicted in FIGS. 18-21. This center section is similar to center section 125 described before, but pump running surface 217 is lowered with respect to motor running surfaces 218a, 218b such that a plane formed by pump running surface 217 would pass through both motor running surfaces 218a, 218b. One of the mounting extensions 221 would be modified slightly as depicted to accommodate the changed structure. The internal fluid passages connecting pump kidney ports 226, 227 with motor kidney ports 246, 247 will change as well to accommodate the different overall shape, but the concept remains the same. Such center sections 125, 225 are usually permanent mold cast or manufactured using lost foam or similar methods.

Center section 225 may also includes an optional charge pump 284 of a standard gerotor design disposed in a charge pump housing 285 that may be integrally formed on the bottom of center section 225 or formed as a separate component (as shown) interfacing with locating features (not shown) formed on center section 225 and lower housing 214. Charge pump housing 285 and lower housing 214 that is secured to upper housing 212 cooperate to form a gallery 285a in which check valves 237a and 237b may be disposed. An inlet passage 286a permits oil to flow from the sump 282 to gerotor 284, where it is then pressurized and provided through charge outlet passage 286b to gallery 285a so that it is accessible to check valves 237a, 237b. Inlet passage 286a and outlet passage 286b may be integrally cast into the outer, lower surface of center section 225, for ease of manufacture.

It will be understood by one of skill in the art that pump input shaft 210 will have an extended portion (not shown) to drive charge pump 284, or that this input shaft 210 may be extended further to drive an auxiliary pump (not shown) mounted on lower housing 214 to provide charged hydraulic fluid to a separate, auxiliary device. For example, this auxiliary pump may be used as a power steering pump to provide pressurized hydraulic fluid to a power steering piston (not shown).

In the embodiment depicted in, e.g., FIG. 3, brake actuation shaft 151 is depicted as being generally vertical with respect to ground, and parallel to the rotational axis of pump input shaft 110. In the embodiment depicted in, e.g., FIGS. 14 and 15, brake actuation shaft 251, cam 252 and brake puck 253 are disposed on the top of the transmission, so that brake actuation shaft 251 is disposed in a horizontal position with respect to ground (i.e., perpendicular to the rotational axis of pump input shaft 210), thereby affording greater flexibility to the vehicle manufacturer in terms of linkages, etc., because of the location and orientation of brake arm 250.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus for a vehicle having a prime mover, comprising:
    a first steerable hub assembly comprising a first gear assembly and a first rotatable output driven by the first gear assembly;
    a second steerable hub assembly comprising a second gear assembly and a second rotatable output driven by the second gear assembly;
    a transmission disposed in a housing and receiving an input from the prime mover, the transmission comprising:
    a center section comprising hydraulic porting, a first running surface having a first set of ports connected to the hydraulic porting, a second running surface having a second set of ports connected to the hydraulic porting and a third running surface having a third set of ports connected to the hydraulic porting;
    a hydraulic pump disposed on the first running surface and hydraulically connected to the first set of ports;
    a first hydraulic motor disposed on the second running surface and hydraulically connected to the second set of ports;
    a second hydraulic motor disposed on the third running surface and hydraulically connected to the third set of ports; and
    a first motor output shaft engaged to and driven by the first hydraulic motor, and a second motor output shaft engaged to and driven by the second hydraulic motor, wherein the first motor output shaft extends from the transmission to the first gear assembly and the second motor output shaft extends from the transmission to the second gear assembly.

2. The drive apparatus of claim 1, wherein a first rotational axis of the first motor output shaft lies in the same plane as a second rotational axis of the second motor output shaft and wherein the first and second rotational axes are non-parallel.

3. The drive apparatus of claim 2, wherein a proximal end of the first motor output shaft and a proximal end of the second motor output shaft are both rotatably supported in the center section.

4. The drive apparatus of claim 1, wherein a first plane formed by the second running surface intersects a second plane formed by the third running surface at an acute angle.

5. The drive apparatus of claim 4, further comprising a pump input shaft engaged to and driving the hydraulic pump and having an axis of rotation, wherein the center section is symmetrical about a third plane passing through the axis of rotation of the pump input shaft.

6. The drive apparatus of claim 1, wherein the housing comprises a transmission chamber forming a sump in which the transmission is disposed, a first output shaft housing mounted to a first joint surface at one end of the transmission chamber and a second output shaft housing mounted to a second joint surface at a second end of the transmission chamber, wherein the first motor output shaft is disposed in the first output shaft housing and the second motor output shaft is disposed in the second output shaft housing and the transmission chamber is segregated from the first output shaft housing and the second output shaft housing.

7. The drive apparatus of claim 1, wherein the first rotatable output driven by the first gear assembly comprises a first rotatable hub capable of engaging a first driven wheel of the vehicle, and the second rotatable output driven by the second gear assembly comprises a second rotatable hub capable of engaging a second driven wheel of the vehicle.

8. The drive apparatus of claim 7, further comprising:
    a first gear disposed on a distal end of the first motor output shaft, the first gear driving a first plurality of bevel gears, wherein the first plurality of bevel gears drive the first rotatable hub; and
    a second gear disposed on a distal end of the second motor output shaft, the second gear driving a second plurality of bevel gears, wherein the second plurality of bevel gears drive the second rotatable hub.

9. The drive apparatus of claim 8, wherein the first plurality of bevel gears comprises a first upper bevel gear and a first lower bevel gear joined together by a first gear shaft, and the second plurality of bevel gears comprises a second upper bevel gear and a second lower bevel gear joined together by a second gear shaft.

10. The drive apparatus of claim 9, further comprising:
    a first bevel gear housing, wherein the first upper bevel gear is disposed therein;
    a first hub gear disposed in a first hub gear housing and driven by the first lower bevel gear, the first hub gear engaged to and driving the first rotatable hub;
    a second bevel gear housing, wherein the second upper bevel gear is disposed therein; and a second hub gear disposed in a second hub gear housing and driven by the second lower bevel gear, the second hub gear engaged to and driving the second rotatable hub.

11. A drive apparatus for a vehicle having a prime mover, comprising:
a first steerable hub assembly, and a first rotatable output hub extending from the first steerable hub assembly and disposed on a first axle;
a second steerable hub assembly, and a second rotatable output hub extending from the second steerable hub assembly and disposed on a second axle; and
a transmission disposed in a housing and receiving an input from the prime mover, the transmission comprising:
a center section comprising hydraulic porting, a first running surface having a first set of ports connected to the hydraulic porting, a second running surface having a second set of ports connected to the hydraulic porting and a third running surface having a third set of ports connected to the hydraulic porting;
a hydraulic pump disposed on the first running surface and hydraulically connected to the first set of ports;
a first hydraulic motor disposed on the second running surface and hydraulically connected to the second set of ports, and a first motor output shaft engaged to and driven by the first hydraulic motor; and
a second hydraulic motor disposed on the third running surface and connected to the third set of ports, and a second motor output shaft engaged to and driven by the second hydraulic motor.

12. The drive apparatus of claim 11, wherein the first motor output shaft extends from the transmission to the first steerable hub assembly and the second motor output shaft extends from the transmission to the second steerable hub assembly.

13. The drive apparatus of claim 11, further comprising:
a first gear disposed on a distal end of the first motor output shaft, the first gear driving a first plurality of bevel gears, wherein the first plurality of bevel gears drive the first rotatable output hub; and
a second gear disposed on a distal end of the second motor output shaft, the second gear driving a second plurality of bevel gears, wherein the second plurality of bevel gears drive the second rotatable output hub.

14. The drive apparatus of claim 13, wherein the first plurality of bevel gears comprises a first upper bevel gear and a first lower bevel gear joined together by a first gear shaft, and the second plurality of bevel gears comprises a second upper bevel gear and a second lower bevel gear joined together by a second gear shaft.

15. The drive apparatus of claim 14, further comprising:
a first bevel gear housing, wherein the first upper bevel gear is disposed therein;

a first hub gear disposed in a first hub gear housing and driven by the first lower bevel gear, the first hub gear engaged to and driving the first rotatable output hub;
a second bevel gear housing, wherein the second upper bevel gear is disposed therein; and
a second hub gear disposed in a second hub gear housing and driven by the second lower bevel gear, the second hub gear engaged to and driving the second rotatable output hub.

16. The drive apparatus of claim 11, wherein the rotational axis of the first motor output shaft is not parallel to the rotational axis of the second motor output shaft.

17. The drive apparatus of claim 11, wherein the housing comprises a transmission chamber forming a sump in which the transmission is disposed, a first output shaft housing mounted to a first joint surface at one end of the transmission chamber and a second output shaft housing mounted to a second joint surface at a second end of the transmission chamber, wherein the first motor output shaft is disposed in the first output shaft housing and the second motor output shaft is disposed in the second output shaft housing and the transmission chamber is segregated from the first output shaft housing and the second output shaft housing.

18. The drive apparatus of claim 17, further comprising a first bellows located at the first joint surface, and a second bellows located at the second joint surface.

19. The drive apparatus of claim 11, wherein a third plane formed by the second running surface intersects a fourth plane formed by the third running surface at an acute angle.

20. A vehicle, comprising:
a prime mover, a first driven wheel and a second driven wheel;
a housing disposed on the vehicle and comprising a transmission chamber, a first output shaft housing mounted to a first joint surface at one end of the transmission chamber and a second output shaft housing mounted to a second joint surface at a second end of the transmission chamber, wherein the transmission chamber is segregated from the first output shaft housing and the second output shaft housing;
a first steerable hub assembly comprising a first gear assembly and a first rotatable hub engaged to and driving the first driven wheel;
a second steerable hub assembly comprising a second gear assembly and a second rotatable hub engaged to and driving the second driven wheel; and
a transmission disposed in the transmission chamber and receiving an input from the prime mover, the transmission comprising a first motor output shaft disposed in the first output shaft housing and a second motor output shaft disposed in the second output shaft housing, wherein the first motor output shaft extends from the transmission to the first gear assembly and the second motor output shaft extends from the transmission to the second gear assembly.

* * * * *